US012602280B2

(12) United States Patent (10) Patent No.: US 12,602,280 B2
Bhukar et al. (45) Date of Patent: Apr. 14, 2026

(54) ENTITY ASSIGNMENT IN AUTOMATED ISSUE RESOLUTION

(71) Applicant: International Business Machines Corporation, Armonk, NY (US)

(72) Inventors: Karan Bhukar, Jaipur (IN); Harshit Kumar, Delhi (IN); Amar Prakash Azad, Bangalore (IN); Sachindra Joshi, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 18/483,016

(22) Filed: Oct. 9, 2023

(65) Prior Publication Data

US 2025/0117282 A1 Apr. 10, 2025

(51) Int. Cl.
*G06F 11/00* (2006.01)
*G06F 11/07* (2006.01)
*G06Q 10/0631* (2023.01)
(52) U.S. Cl.
CPC .. *G06F 11/0793* (2013.01); *G06Q 10/063112* (2013.01)
(58) Field of Classification Search
CPC .................... G06F 11/0793; G06Q 10/063112
USPC ........................................................ 714/1–57
See application file for complete search history.

(56) References Cited

U.S. PATENT DOCUMENTS 9,430,359 B1 * 8/2016 Troutman ........... G06F 11/0793
9,679,300 B2 6/2017 Lynch et al.
10,440,187 B1 10/2019 Mandel et al.
10,904,169 B2 1/2021 Barve et al.
11,249,836 B2 2/2022 Al-Bahar et al.
2013/0326273 A1* 12/2013 Tredoux ............. G11B 20/1803
714/15

(Continued)

FOREIGN PATENT DOCUMENTS

CN 109740951 A 5/2019
CN 112989061 A 6/2021
CN 119807330 A 4/2025

OTHER PUBLICATIONS

Tung et al., "A rule-based CBR approach for expert finding and problem diagnosis" Elsevier, ScienceDirect. Mar. 15, 2010. (12 pages).

(Continued)

*Primary Examiner* — Sarai E Butler

(74) *Attorney, Agent, or Firm* — Amin, Turocy & Watson, LLP

(57) ABSTRACT

Various systems and methods are presented herein regarding automatically identifying one or more entities to for assignment to resolving an issue and/or removing an entity from a group of entities assigned to resolve the issue. The issue can relate to an information technology/computer-based environment. The entities can be subject matter experts, having expertise identified to be related to the issue. A summary of the issue and activity relating to resolving the issue can be automatically generated and supplied to an entity who is being onboarded after the project is underway to resolve the issue. By implementing automated assignment/removal of entities, efficiency of the resolution is improved.

17 Claims, 13 Drawing Sheets

(56)          References Cited

U.S. PATENT DOCUMENTS

| | | | | |
|---|---|---|---|---|
| 2014/0019193 A1* | 1/2014 | Eisele | ................ | G06Q 10/0635 |
| | | | | 705/7.28 |
| 2014/0115381 A1* | 4/2014 | Chang | ................ | G11B 20/1833 |
| | | | | 714/E11.062 |
| 2020/0099790 A1 | 3/2020 | Ma et al. | | |
| 2021/0014136 A1 | 1/2021 | Rath | | |
| 2021/0397495 A1* | 12/2021 | Prakash | ................ | G06F 11/008 |

OTHER PUBLICATIONS

Zhang et al., "Making Sense of Group Chat through Collaborative Tagging and Summarization" Proceedings of the ACM on Human-Computer Interaction, vol. 2, No. CSCW, Article 196. Publication date: Nov. 2018. Nov. 1, 2018. (27 pages).

\* cited by examiner

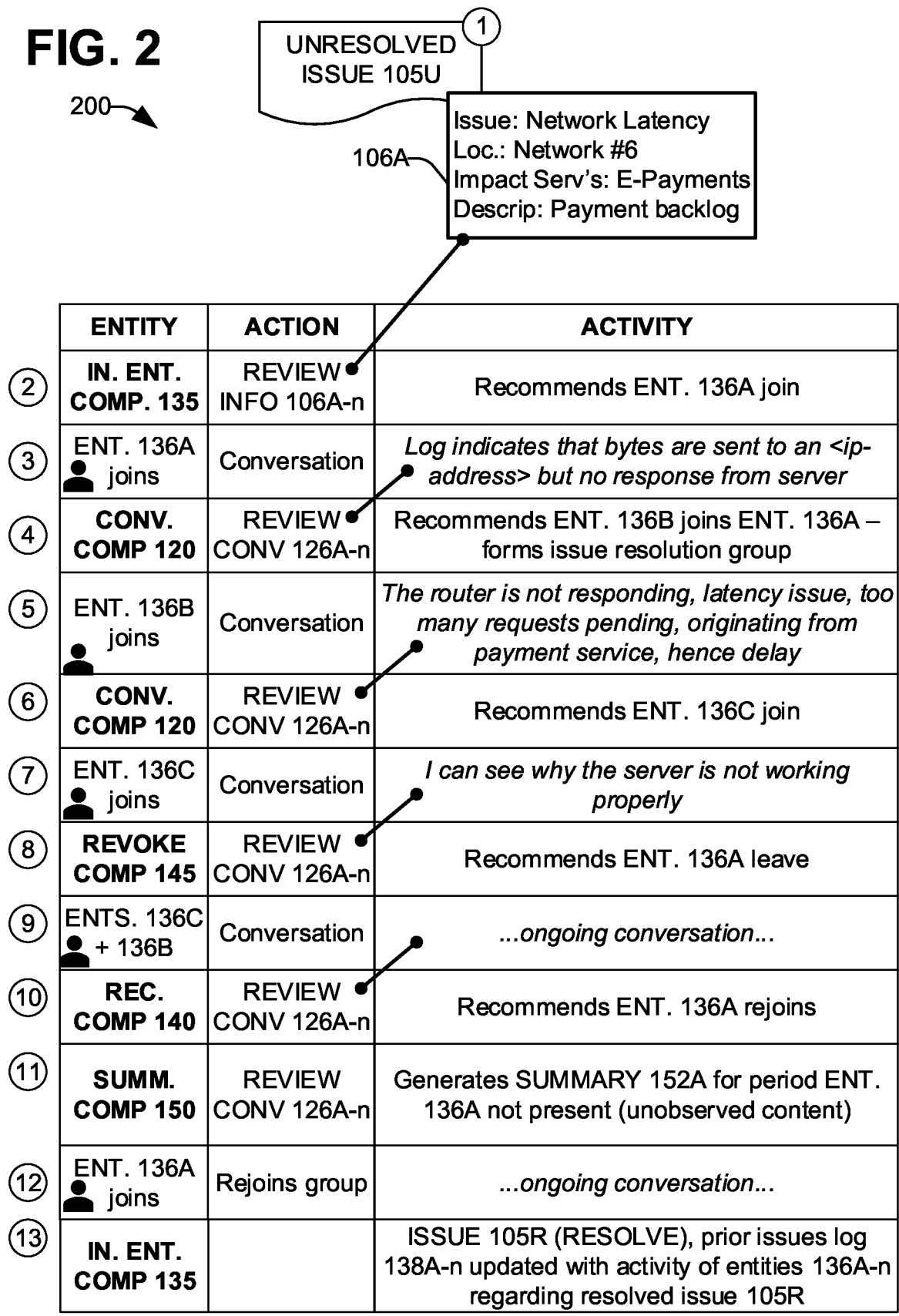

UNRESOLVED ① ISSUE 105U

Issue: Network Latency
Loc.: Network #6
Impact Serv's: E-Payments
Descrip: Payment backlog

106A

| ENTITY | ACTION | ACTIVITY |
|---|---|---|
| ② IN. ENT. COMP. 135 | REVIEW INFO 106A-n | Recommends ENT. 136A join |
| ③ ENT. 136A joins | Conversation | *Log indicates that bytes are sent to an <ip-address> but no response from server* |
| ④ CONV. COMP 120 | REVIEW CONV 126A-n | Recommends ENT. 136B joins ENT. 136A – forms issue resolution group |
| ⑤ ENT. 136B joins | Conversation | *The router is not responding, latency issue, too many requests pending, originating from payment service, hence delay* |
| ⑥ CONV. COMP 120 | REVIEW CONV 126A-n | Recommends ENT. 136C join |
| ⑦ ENT. 136C joins | Conversation | *I can see why the server is not working properly* |
| ⑧ REVOKE COMP 145 | REVIEW CONV 126A-n | Recommends ENT. 136A leave |
| ⑨ ENTS. 136C + 136B | Conversation | *...ongoing conversation...* |
| ⑩ REC. COMP 140 | REVIEW CONV 126A-n | Recommends ENT. 136A rejoins |
| ⑪ SUMM. COMP 150 | REVIEW CONV 126A-n | Generates SUMMARY 152A for period ENT. 136A not present (unobserved content) |
| ⑫ ENT. 136A joins | Rejoins group | *...ongoing conversation...* |
| ⑬ IN. ENT. COMP 135 | | ISSUE 105R (RESOLVE), prior issues log 138A-n updated with activity of entities 136A-n regarding resolved issue 105R |

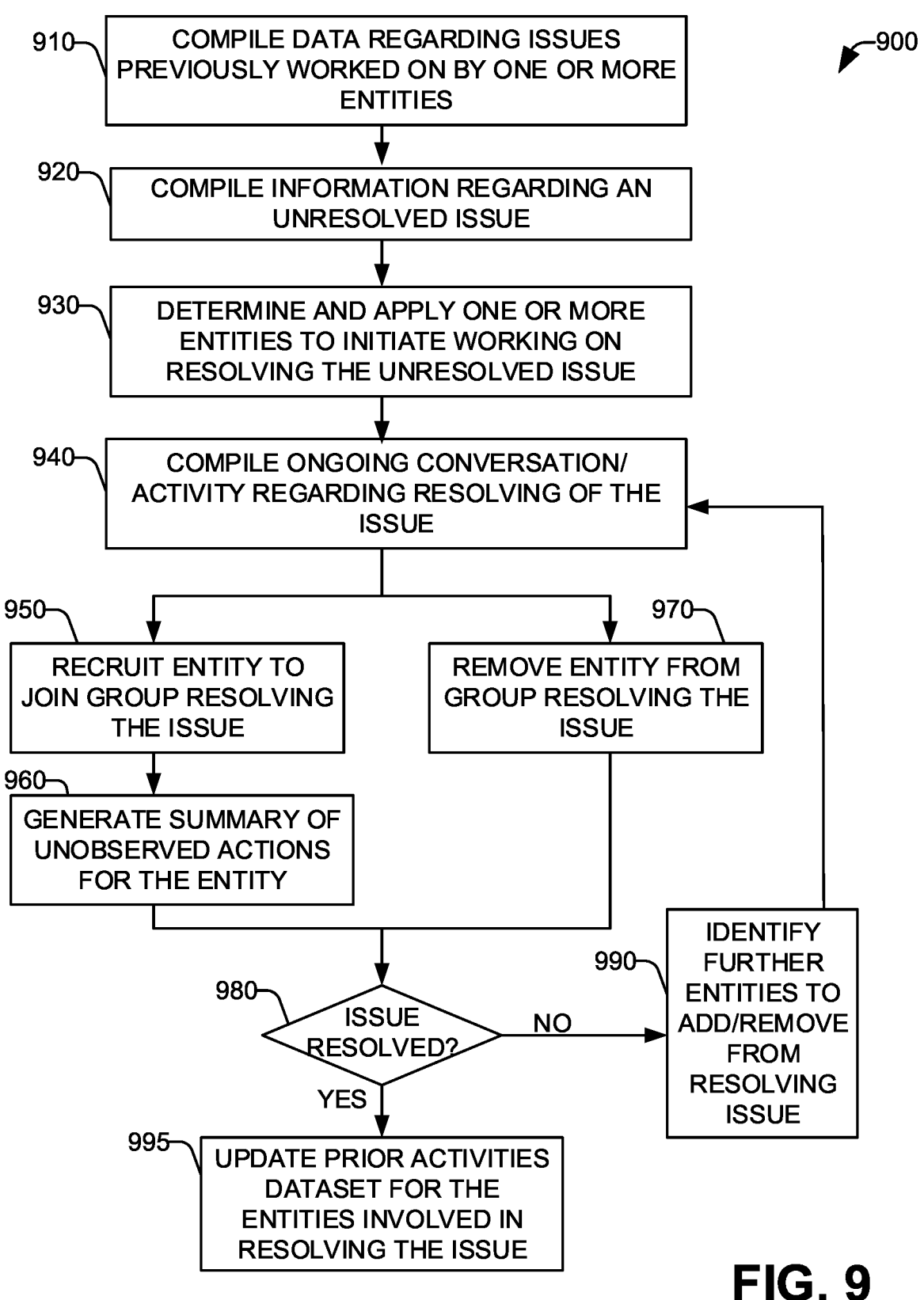

910 — COMPILE DATA REGARDING ISSUES PREVIOUSLY WORKED ON BY ONE OR MORE ENTITIES

920 — COMPILE INFORMATION REGARDING AN UNRESOLVED ISSUE

930 — DETERMINE AND APPLY ONE OR MORE ENTITIES TO INITIATE WORKING ON RESOLVING THE UNRESOLVED ISSUE

940 — COMPILE ONGOING CONVERSATION/ ACTIVITY REGARDING RESOLVING OF THE ISSUE

950 — RECRUIT ENTITY TO JOIN GROUP RESOLVING THE ISSUE

970 — REMOVE ENTITY FROM GROUP RESOLVING THE ISSUE

960 — GENERATE SUMMARY OF UNOBSERVED ACTIONS FOR THE ENTITY

980 — ISSUE RESOLVED?

NO

990 — IDENTIFY FURTHER ENTITIES TO ADD/REMOVE FROM RESOLVING ISSUE

YES

995 — UPDATE PRIOR ACTIVITIES DATASET FOR THE ENTITIES INVOLVED IN RESOLVING THE ISSUE

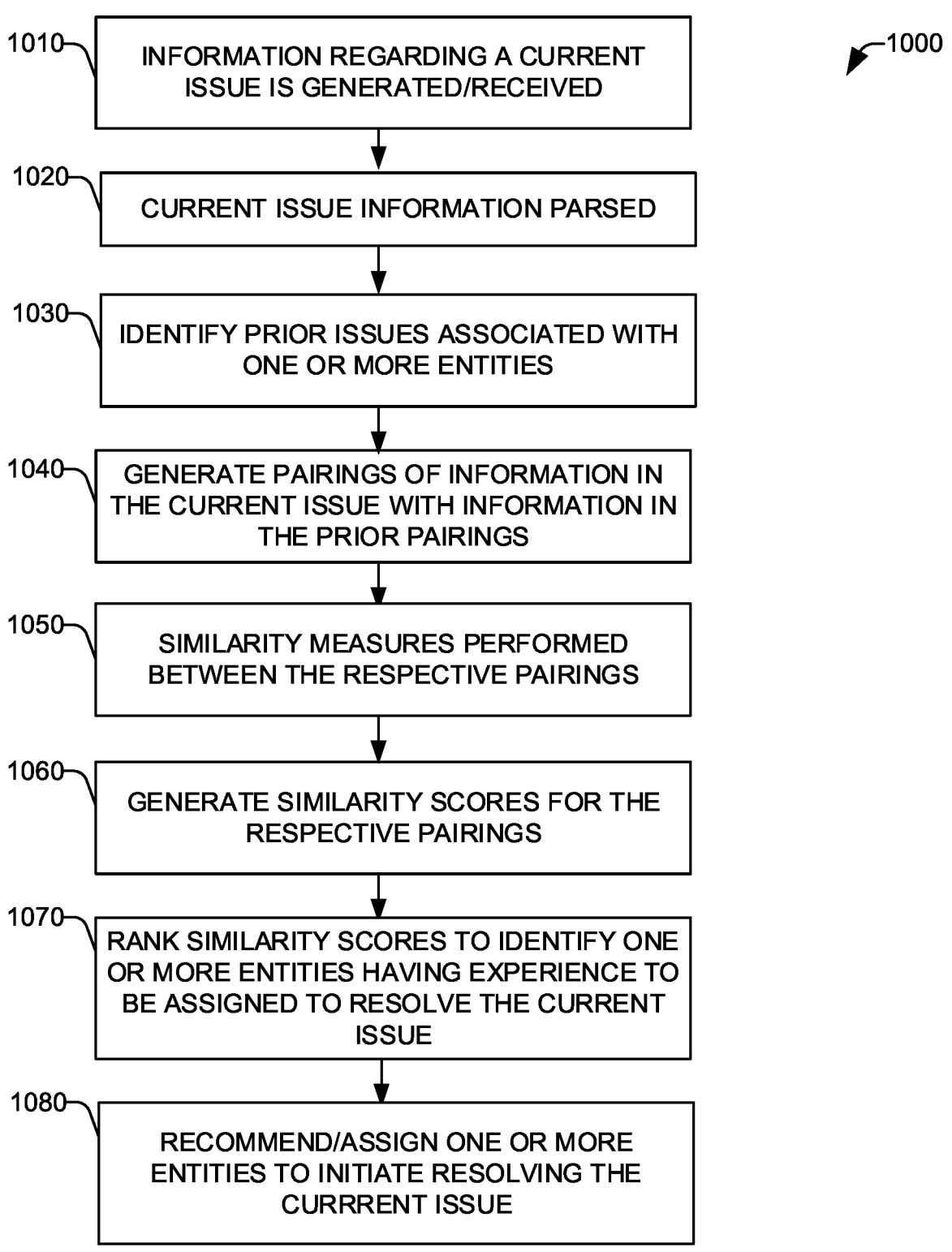

1000

1010 — INFORMATION REGARDING A CURRENT ISSUE IS GENERATED/RECEIVED

1020 — CURRENT ISSUE INFORMATION PARSED

1030 — IDENTIFY PRIOR ISSUES ASSOCIATED WITH ONE OR MORE ENTITIES

1040 — GENERATE PAIRINGS OF INFORMATION IN THE CURRENT ISSUE WITH INFORMATION IN THE PRIOR PAIRINGS

1050 — SIMILARITY MEASURES PERFORMED BETWEEN THE RESPECTIVE PAIRINGS

1060 — GENERATE SIMILARITY SCORES FOR THE RESPECTIVE PAIRINGS

1070 — RANK SIMILARITY SCORES TO IDENTIFY ONE OR MORE ENTITIES HAVING EXPERIENCE TO BE ASSIGNED TO RESOLVE THE CURRENT ISSUE

1080 — RECOMMEND/ASSIGN ONE OR MORE ENTITIES TO INITIATE RESOLVING THE CURRRENT ISSUE

FIG. 10

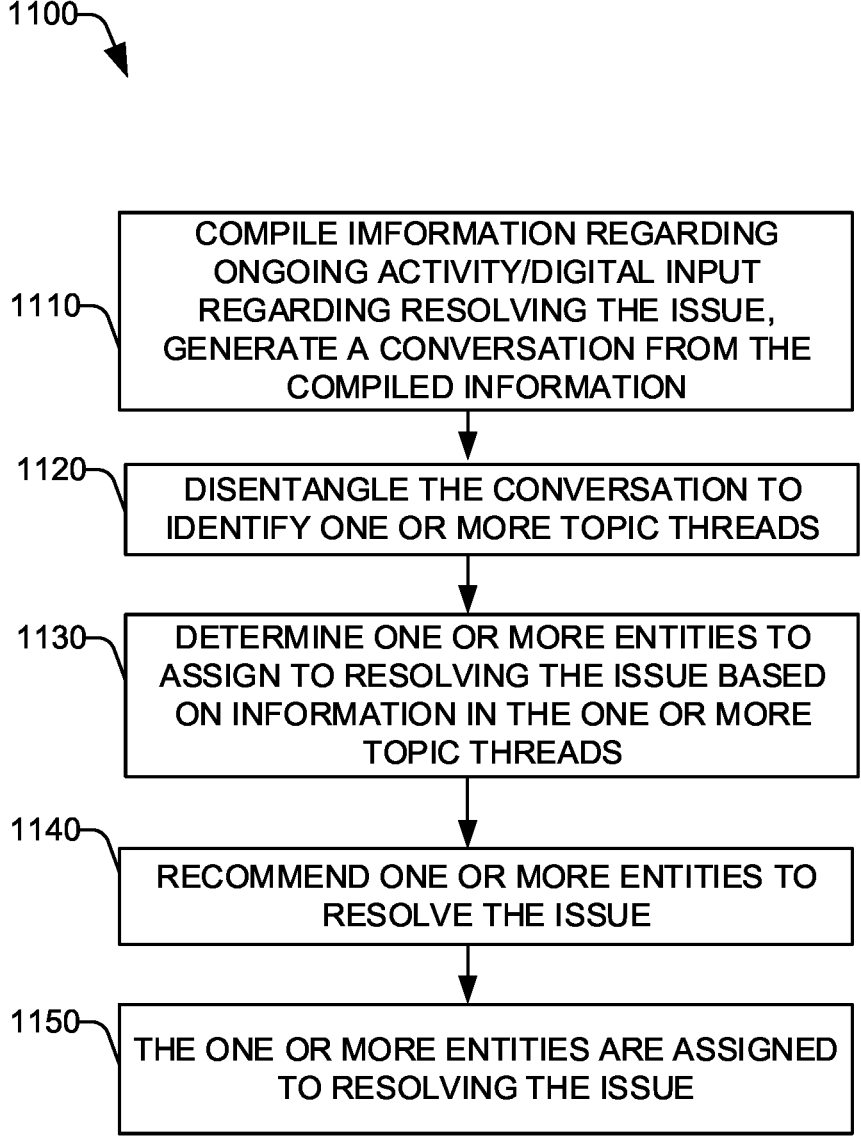

1100

1110 — COMPILE IMFORMATION REGARDING ONGOING ACTIVITY/DIGITAL INPUT REGARDING RESOLVING THE ISSUE, GENERATE A CONVERSATION FROM THE COMPILED INFORMATION

1120 — DISENTANGLE THE CONVERSATION TO IDENTIFY ONE OR MORE TOPIC THREADS

1130 — DETERMINE ONE OR MORE ENTITIES TO ASSIGN TO RESOLVING THE ISSUE BASED ON INFORMATION IN THE ONE OR MORE TOPIC THREADS

1140 — RECOMMEND ONE OR MORE ENTITIES TO RESOLVE THE ISSUE

1150 — THE ONE OR MORE ENTITIES ARE ASSIGNED TO RESOLVING THE ISSUE

FIG. 11

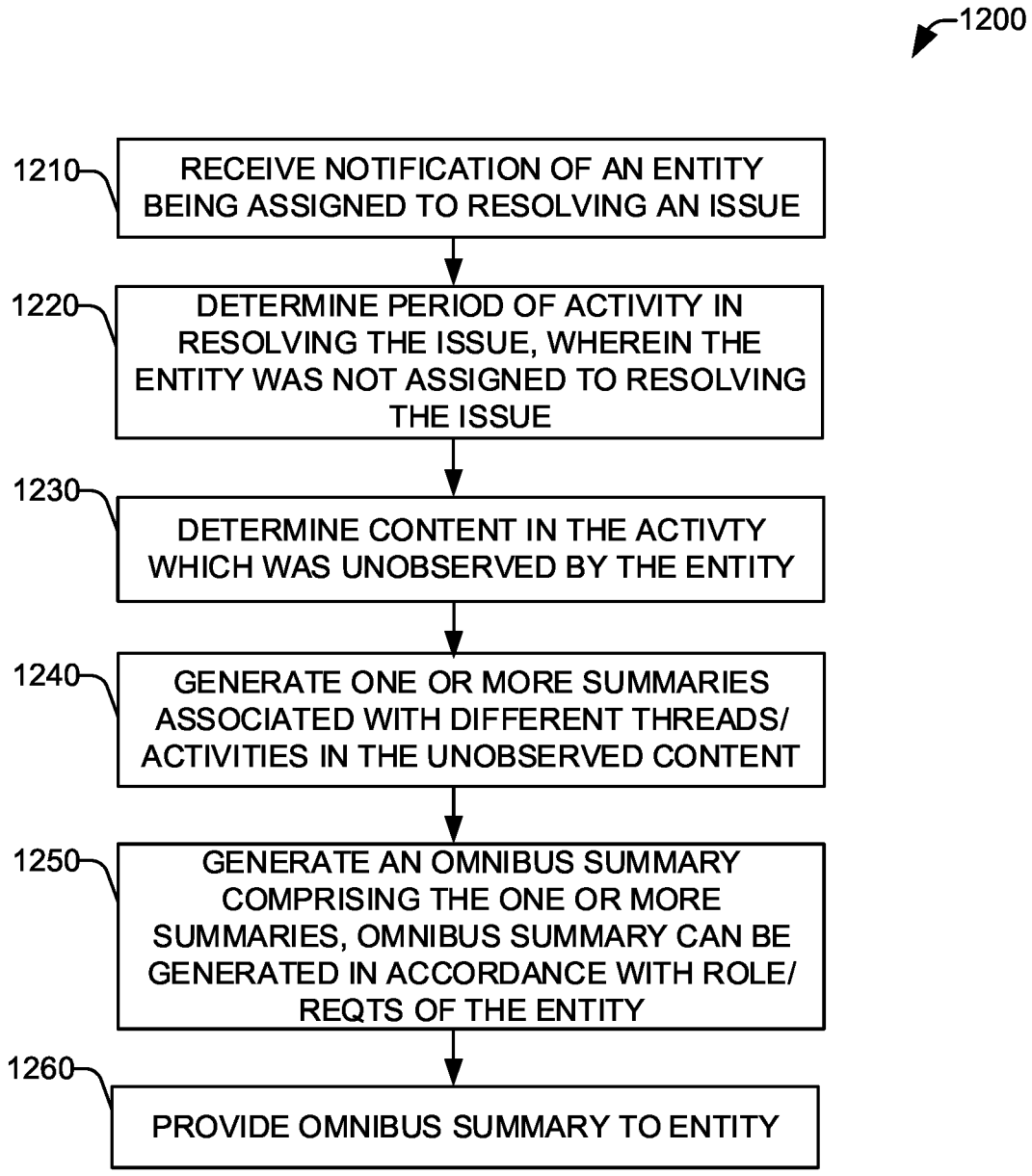

1200

1210 — RECEIVE NOTIFICATION OF AN ENTITY BEING ASSIGNED TO RESOLVING AN ISSUE

1220 — DETERMINE PERIOD OF ACTIVITY IN RESOLVING THE ISSUE, WHEREIN THE ENTITY WAS NOT ASSIGNED TO RESOLVING THE ISSUE

1230 — DETERMINE CONTENT IN THE ACTIVTY WHICH WAS UNOBSERVED BY THE ENTITY

1240 — GENERATE ONE OR MORE SUMMARIES ASSOCIATED WITH DIFFERENT THREADS/ ACTIVITIES IN THE UNOBSERVED CONTENT

1250 — GENERATE AN OMNIBUS SUMMARY COMPRISING THE ONE OR MORE SUMMARIES, OMNIBUS SUMMARY CAN BE GENERATED IN ACCORDANCE WITH ROLE/ REQTS OF THE ENTITY

1260 — PROVIDE OMNIBUS SUMMARY TO ENTITY

FIG. 12

ENTITY ASSIGNMENT IN AUTOMATED ISSUE RESOLUTION

BACKGROUND

The subject disclosure relates to automatically identifying and engaging entities to assist in resolving an issue(s) in an information technology (IT) environment.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate automatically identifying an entity to be assigned or revoked involvement with resolving an issue.

According to one or more embodiments, a system is provided to assign to, or revoke, involvement of an entity in resolving an issue. The system can comprise a memory operatively coupled to the system, wherein the memory stores computer executable components and a processor that executes the computer executable components stored in the memory. The computer executable components can comprise an initial entity component configured to identify first content pertaining to an issue, and based on the first content, identify second content in at least one prior issue resolution, wherein the first content and the second content are similar, further identify a first entity associated with second content; and further assign the first entity to initiate a process for resolving the issue. In an embodiment, the first content can be included in information initially compiled regarding the issue. In another embodiment, the issue can be an event in an information technology system.

In another embodiment, the computer executable components can further comprise a recommend entity component configured to identify third content pertaining to the issue, wherein the third content can be a digital entry submitted by the first entity while attempting to resolve the issue. The recommend entity component can be further configured to, based on the third content, identify a second entity to partake in resolving the issue, and assign the second entity to resolve the issue. The recommend entity component can be further configured to identify fourth content, wherein the fourth content is generated in a digital conversation between the first entity and the second entity, wherein the digital conversation pertains to resolving the issue. Based on the fourth content, the recommend entity component can be further configured to identify a third entity to partake in resolving the issue, and further assign the third entity to join the first entity and the second entity in resolving the issue.

In a further embodiment, the computer-executable components can further comprise a summary component configured to identify a first time, wherein the first time is a time at which the third entity was assigned to resolving the issue, further identify a second time, wherein the second time is the time at which resolution of the issue was initiated, further determine activities performed by the first entity and the second entity in resolving the issue between the first time and the second time, generate a summary of the activities performed by the first entity and the second entity between the first time and the second time, and provide the third entity with the summary. In another embodiment, the summary component can be further configured to receive an operational role of the third entity, and configure the summary based on the operational role of the third entity.

In another embodiment, the first entity, the second entity, and the third entity comprise a group of entities assigned to resolve the issue. In a further embodiment, the computer-executable components further comprise a revoke entity component configured to further monitor the digital conversation between the group of entities to identify a period of time for which the first entity in the group of entities has not partaken in the conversation, determine whether the period of time exceeds a threshold period of time, and based on the period of time exceeds the threshold period of time, remove the first entity from the group of entities.

In a further embodiment, the recommend entity component can be further configured to further monitor the digital conversation between the second entity and third entity, determine the digital conversation pertains to the first entity, and further re-assign the first entity to the group of entities resolving the issue.

In a further embodiment, the summary component can be further configured to (a) identify a third time, wherein the third time is a time at which the first entity removed from the group of entities was assigned to resolving the issue, (b) identify a fourth time, wherein the fourth time is the current time of resolving the issue by the second entity and the third entity, (c) determine activities performed by the second entity and the third entity in resolving the issue between the third time and the fourth time, (d) generate a second summary of the activities performed by the second entity and the third entity between the third time and the fourth time, and (e) provide the first entity with the second summary.

In another embodiment, the revoke entity component can be configured to further monitor the digital conversation between the group of entities to identify a number of consecutive messages in the digital conversation during which the first entity in the group of entities did not generate a message in the digital conversation, further determine whether the number of consecutive messages exceeds a threshold number of messages, and based on the number of consecutive messages exceeds the threshold number of messages, remove the first entity from the group of entities assigned to resolving the issue.

In other embodiments, elements described in connection with the disclosed systems can be embodied in different forms such as computer-implemented methods, computer program products, or other forms. In an embodiment, the computer-implemented method can be performed by a device operatively coupled to a processor, wherein the computer-implemented method can comprise identifying a first entity to initiate resolving a current issue, wherein the first entity can be identified based on a prior issue to which the first entity was previously assigned is similar to the current issue, and assigning the first entity to initiate resolving the current issue wherein the current issue relates to performance of an information technology operation.

In a further embodiment, the computer-implemented method can further comprise parsing digital content created by the first entity while attempting to resolve the issue, reviewing one or more prior activities, wherein the prior activities involve a second entity, determining the one or more prior activities relate to the digital content, and further recommending the second entity assist the first entity in resolving the issue.

In another embodiment, the computer-implemented method can further comprise monitoring activity of the first entity and the second entity in attempting to resolve the issue, comparing activity of the second entity in attempting to resolve the issue, determining the second entity is no longer engaged in attempting to resolve the issue, and further revoking engagement of the second entity in resolving the issue. In an embodiment, the determination of the second entity is no longer engaged in attempting to resolve the issue can be based on at least one of a period of inactivity or amount of digital content generated.

The computer-implemented method can further comprise further comprise determining an engagement time, wherein the engagement time can be the time at which the second entity joined the first entity in attempting to resolve the issue. The computer-implemented method can further comprise determining unobserved activity undertaken by the first entity between initiation of resolving the issue and the engagement time, wherein the unobserved activity is activity performed by at least the first entity in resolving the issue, further generating a summary of the unobserved activity, and further providing the summary of the unobserved activity to the second entity.

Another embodiment can further comprise a computer program product stored on a non-transitory computer-readable medium and comprising machine-executable instructions, wherein, in response to being executed, the machine-executable instructions cause a machine to perform operations, comprising identifying a first entity to initiate resolving a current issue, wherein the first entity is identified based on a prior issue to which the first entity was previously assigned is similar to the current issue, and assigning the first entity to initiate resolving the current issue wherein the current issue relates to performance of an information technology operation.

In a further embodiment, the operations can further comprise parsing digital content created by the first entity while attempting to resolve the issue, reviewing one or more prior activities, wherein the prior activities involve a second entity, determining the one or more prior activities relate to the digital content, and further recommending the second entity assist the first entity in resolving the issue.

In a further embodiment, the operations can further comprise monitoring activity of the first entity and the second entity in attempting to resolve the issue, comparing activity of the second entity in attempting to resolve the issue, determining the second entity is no longer engaged in attempting to resolve the issue; and further revoking engagement of the second entity in resolving the issue.

In another embodiment, the operations can further comprise determining an engagement time, wherein the engagement time is the time at which the second entity joined the first entity in attempting to resolve the issue and further determining unobserved activity undertaken by the first entity between initiation of resolving the issue and the engagement time, wherein the unobserved activity is activity performed by at least the first entity in resolving the issue. The operations can further comprise identifying an operational role of the second entity, generating a summary of the unobserved activity, wherein the summary is generated based on the operational role of the second entity, and providing the summary of the unobserved activity to the second entity.

DESCRIPTION OF THE DRAWINGS

One or more embodiments are described below in the Detailed Description section with reference to the following drawings:

FIG. 2 is a schematic providing a high-level overview of the datasets being modified for application in a fused language model, in accordance with one of more embodiments presented herein.

FIG. 9 illustrates a computer-implemented methodology for automatically assigning entities to and/or removing entities from a project to resolve an issue, according to one or more embodiments.

FIG. 10 illustrates a computer-implemented methodology for automatically initially assigning entities to a project to resolve an issue, according to one or more embodiments.

FIG. 11 illustrates a computer-implemented methodology for automatically recommending/assigning an entity to a project to resolve an issue, according to one or more embodiments.

FIG. 12 illustrates a computer-implemented methodology for automatically generating a summary of activity that an entity did not observe during resolution of an issue, in accordance with one or more embodiments.

DETAILED DESCRIPTION

Figure 1:
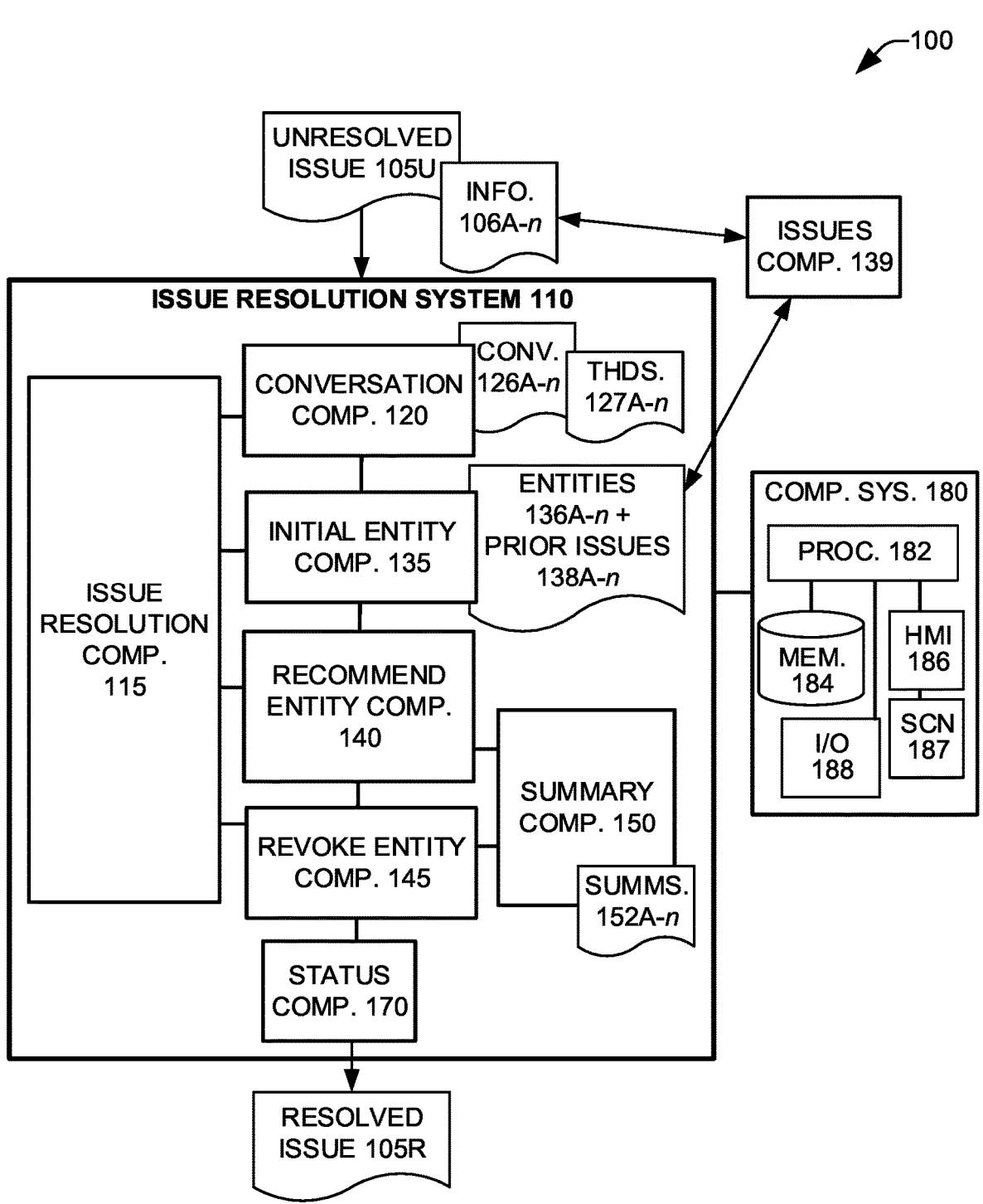
FIG. 1 illustrates a system that can be utilized to automatically assign one or more entities to assist in issue resolution in an IT environment, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n and 1-i are utilized herein to indicate a respective plurality of devices, components, statements, attributes, etc., where n and i are any positive integer.

Resolving issues/events in an IT environment/system can often be both labor-intensive and inefficient. For example, in a conventional IT operation, when an operational issue is detected numerous entities (e.g., subject matter experts, developers, database managers, network administrators, and suchlike) can be assigned to resolve the issue, whereby such assignment can involve random assignment of the respective entities.

Application of various automated artificial intelligence (AI) (also known as AIOps) and machine learning (ML) technologies, techniques, operations, processes, etc., can assist in gathering data pertaining to the issue and generating a "story" to provide information regarding such aspects as what is the issue?, where has the issue been detected (e.g., fault location), what systems/services are impacted by the issue?, and suchlike, however, poor implementation of subject matter experts, etc., can still lead to inefficient/costly resolution of an issue. For example, owing to a randomness in how entities are selected to troubleshoot an issue, an assembled team of subject matter experts may be overly excessive in terms of number of team members, and further, certain team members may have a skillset that is useful to address a pertinent portion of the issue but at other times, those team members may have little to no involvement in resolving the issue, but the team members are still included in the team to resolve the issue resolution. Hence, team members may be being needlessly kept up to speed/informed of how resolution of an issue is being conducted, when in actuality, their attention could be focused on other matters no longer pertaining to resolution of the aforementioned issue.

Accordingly, in a non-limiting list, it would be beneficial that when an issue arises:

(a) only an entity/entities having some level of direct involvement in resolving the issue is/are brought onboard (e.g., from the initiation of the conflict resolution when the issue is detected);

(b) as resolution of an issue is undertaken, an entity (e.g., a necessary subject matter expert) is not brought onto the team until needed, and quickly informed of the work conducted so far in resolving the issue;

(c) when the particular expertise of a particular entity is no longer involved in addressing the issue, that entity's involvement in the issue resolution process is efficiently curtailed/revoked, e.g., so the entity can work on other issues; and (d) if an entity was previously involved in the project, was temporarily uninvolved (e.g., had their involvement revoked) in the project, and their involvement is now required once more, the entity can be recruited and rapidly informed of the work conducted on resolving the issue while they were not involved.

Per the various embodiments presented herein, AIOps components can be configured to generate an initial outline/story of the issue and known circumstances, etc., with the AIOps components further reviewing the story to automatically determine one or more entities who can be assigned to resolving the issue. During resolution of the issue, any discussion between respective entities directed towards resolving the issue can be analyzed/reviewed further to determine (e.g., by respective AIOps components) whether (a) another entity having a requisite skill should be engaged in resolving the issue, and/or (b) an entity who is currently assigned to the project but no longer has pertinent input in the project is allowed to leave the project to pursue other tasks. If at any time an entity joins the team, e.g., having not initially been involved in the project and/or rejoins the project and hence may not be cognizant of work conducted during their absence, a summary of the work conducted can be provided to the entity to enable the entity to focus their attention on the issue as expeditiously as possible.

It is to be appreciated that while the various embodiments presented herein relate to resolving issues/events in an IT environment/system, the various embodiments are not so limited and can be applied to any operation/process for which entities can be assigned to/removed from a task as a function of identifying one or more entities associated with a task/function. Further, while the various embodiments are directed towards entities that are human, entities can be in any applicable form. For example, the entities are automated processes that can be utilized/revoked as needed to resolve an issue.

Turning now to the drawings, FIG. 1 illustrates a system 100 that can be utilized to automatically assign one or more entities to assist in issue resolution in an IT environment, in accordance with one or more embodiments. System 100 comprises an issue 105 having been identified as requiring to be addressed/resolved, wherein the issue 105 can be in an initial unresolved state, unresolved issue 105U, and in a subsequent, issue resolved state 105R. Activity relating to resolving issue 105U is also referred to herein as the "project". As shown in FIG. 1, resolution of the issue 105 can entail the unresolved issue 105U being applied to/input into an issue resolution system (IRS) 110, wherein, IRS 110 can include various computer-executable components, techniques, processes, and suchlike, configured to assist in resolution of issue 105U, e.g., with intelligent assignment and revocation of involvement of one or more entities in resolving issue 105, e.g., transitioning unresolved issue 105U to a resolved issue 105R.

FIG. 1 presents a high level description of IRS 110, and configuration/operation of respective communicatively coupled components included therein, whereby the various embodiments will be further described/explained in the subsequent drawings/description.

As shown, IRS 110 can include an issue resolution component (IRC) 115, wherein the IRC 115 can be configured to identify respective entities (e.g., subject matter experts) to be included/excluded from one or more stages/processes/operations involved in achieving a resolved issue 105R. The IRC 115 can be communicatively coupled and further configured to utilize various other components, operations, processes, etc., in resolving issue 105. In an embodiment, a conversation component can be utilized compile/archive one or more conversations 126A-n pertaining to resolving issue 105U. In an embodiment, the one or more conversations 126A-n can be being conducted between respective entities 136A-n involved (e.g., at respective times) in trying to achieve a resolved issue 105R. As further described, a conversation 126A-n may comprise more than one topic/subject of conversation, e.g., a conversation 126A-n may comprise a collection of threads 127A-n, wherein, for example, a first thread 127A has a subject matter directed towards network latency, while a second thread 127B has subject matter directed towards how client data is received/processed. As further described, the topic/ subject matter of the respective threads 127A-n can be isolated and utilized to identify/determine which entities 136A-n should be involved in resolving the issue 105U, when the involvement of the entity 136A-n should occur, the focus of attention of the respective entity 136A-n, and suchlike.

The IRC 115 can be further coupled to an initial entity component 135. The initial entity component 135 can be configured to review the issue information 106A-n, and further configured to identify respective entities 136A-n to be initially recruited/engaged/employed in the initial stages of resolving the unresolved issue 105U. As further described, the initial entity component 135 can be configured to identify the respective entities 136A-n by matching prior issues 138A-n (e.g., content, parameters, activity, etc.) that the respective entities 136A-n have worked on with the circumstances relating to the unresolved issue 105U, as detailed in the issue information 106A-n.

An issues component 139 can reside and operate from within the IRS 110, reside and operate from within one or more of the components communicatively coupled in the IRS 110, or reside and operate externally from the IRS 110. The issues component 139 can be configured to compile information and generate the prior issues 138A-n information. Further, during and after resolution of issue 105U, the issues component 139 can be configured to compile information regarding respective activities/utterances/dialog/etc., generated by the respective entities 136A-n in resolving issue 105U and update the prior issues 138A-n information to ensure that the prior issues 138A-n information comprises recent issue resolution activities conducted by the respective entities for future use in identifying and recommending entities for addition to a subsequent issue resolution project. In an embodiment, a status component 170 can be utilized to update a status of issue 105U. For example, status component 170 can be configured to receive an input indicating that issue 105U has been resolved, the issue is updated to being a resolved issue 105R, and further, an instruction can be sent from the status component 170 instructing the issues component 139 to update the prior issues 138A-n information with the issue resolution activities conducted by the respective entities during resolving the issue 105U.

As shown in FIG. 1, in an embodiment, IRC 115 can be further communicatively coupled to a recommend entity component 140 and a revoke entity component 145. As further described, as attempts to resolve issue 105U proceed, the one or more conversations 126A-n can be reviewed (e.g., by the conversation component 120) and one or more determinations made by the recommend entity component 140 regarding whether an entity 136A-n having skill/knowledge pertinent to a current status/situation of the issue 105U should be added to the team resolving the issue 105U. In another embodiment, IRC 115 can be similarly communicatively coupled to the revoke entity component 145 configured to make a determination regarding whether an entity 136A-n currently involved with the project should be dismissed from working on the project. In an embodiment, a summary component 150 can be configured to generate one or more summaries 152A-n, wherein the summary 152A-n can be provided to an entity 136A-n regarding the work performed to date in attempting to resolve issue 105U.

When the unresolved issue 105U becomes resolved to create resolved issue 105R, the resolved issue 105R can be received at status component 170. In an embodiment, an entity 136A-n can generate a notification (e.g., as part of conversation 126) indicating the issue 105R has been achieved, whereupon the status component 170 can be configured to initiate updating the prior issues 138A-n to include the conversation 126A-n/threads 127A-n generated/associated with resolving issue 105U/105R. Updating the prior issues 138A-n with conversation 126A-n/threads 127A-n enables activities of respective entities 136A-n to be updated for review during resolution of a subsequent/future issue 105F.

As shown in FIG. 1, IRS 110 can further include a computer system 180. Computer system 180 can include a memory 184 that stores the respective computer executable components (e.g., IRC 115, conversation component 120, initial entity component 135, recommend entity component 140, revoke entity component 145, summary component 150, and suchlike) and further, a processor 182 configured to execute the computer executable components stored in the memory 184. Memory 184 can further be configured to store any of issue information 106A-n, conversations 126A-n, threads 127A-n, information regarding entities 136A-n, prior issues 138A-n, summaries 152A-n, the unresolved issue 105U, the resolved issue 105R, issue 105, thresholds 520A-n (as later described), and suchlike. The computer system 180 can further include a human machine interface (HMI) 186 (e.g., a display, a graphical-user interface (GUI)) which can be configured to present various information including the unresolved issue 105U, resolved issue 105R, conversations 126A-n, and suchlike, per the various embodiments presented herein. HMI 186 can include an interactive display/screen 187 to present the various information. Computer system 180 can further include an I/O component 188 to receive and/or transmit respective issues 105U/105R, conversations 126A-n, and suchlike.

Before describing operation and/or configuration of the respective components presented in FIG. 1, an example scenario of issue resolution is presented in conjunction with respective component interaction. FIG. 2, example scenario 200, illustrates an issue being detected and various entities automatically being assigned to resolving the issue.

FIG. 2, schematic 200, presents a high-level overview of the datasets being modified for application in a fused language model, in accordance with one of more embodiments presented herein. The example scenario is presented as a series of acts/steps 1-13.

At 200-1, an issue arises, unresolved issue 105U. Unresolved issue 105U can have data/information 106A associated therewith, whereby the information 106A details what is currently known about unresolved issue 105U, for example, issue is network latency identified in network #6, impacts electronic payments service, with a payment backlog being of concern. In an embodiment, information 106A can be generated by an AIOps component (e.g., issues component 139) configured to compile the information 106A into a story, wherein the AIOps component can be located within IRS 110 (e.g., the AIOps component receives information regarding issue 105U and further compiles the information to create information 106A) or external to IRS 110 (e.g., information 106A is received in a compiled form).

At 200-2, the initial entity component 135 can be configured to review information 106A, and further recommend one or more entities 136A-n to be initially assigned to resolving issue 105U. As further described, the initial entity component 135 can review prior issues 138A-n that respective entities 136A-n have been involved with, thereby identifying prospective entities 136A-n to assign to resolving the unresolved issue 105U.

At 200-3, entity 136A is engaged in resolving issue 105U. Entity 136A generates conversation 126A providing an initial evaluation of the circumstances regarding issue 105U. Conversation 126A can be any suitable means, e.g., email, electronic incident log, and suchlike, whereby conversation 126A is in a format enabling automated review. In an embodiment, the respective conversations 126A-n can be compiled/organized into a channel/workspace/repository, such that a conversation 126A-n comprises/includes any/all comments, threads, utterances, conversations, topics, team comments, activities, actions, projects, etc., pertaining to resolving the unresolved issue 105U.

At 200-4, conversation component 120 reviews conversation 126A and based on text matching and suchlike, conversation component 120 identifies one or more sub-issues regarding issue 105U that pertain to knowledge/skillset of entity 136B, and based thereon, conversation component 120 recommends entity 136B joins entity 136A in resolving issue 105U.

At 200-5, entity 136B generates further conversation 126A, e.g., "router not responding", etc.

At 200-6, conversation component 120 reviews continuing conversation 126A and identifies one or more sub-issues regarding issue 105U that pertain to knowledge/skillset of entity 136C, and based thereon, conversation component 120 recommends entity 136C joins entities 136A and 136B to form a group of entities assigned to resolve issue 105U.

At 200-7, entity 136C generates further conversation 126A, e.g., determines why router not responding, etc.

At 200-8, revoke entity component 145 reviews continuing conversation 126A and based on identifying that (a) entity 136C is resolving the issue, (b) entity 136A has not been involved in resolving the issue for a period of time/lack of conversation activity, and suchlike, revoke entity component 145 automatically recommends that owing to the lack of recent engagement by entity 136A in resolving the issue 105U, entity 136A's presence in the entity group is revoked/terminated. Accordingly, entity 136A is removed from resolving issue 105U.

At 200-9, further conversation 126A is conducted between entities 136C and 136B regarding resolving issue 105U. During this time, content (e.g., threads 127A-n) of conversation 126A can be continually reviewed/assessed by both the revoke entity component 145 and the recommend entity component 140 to determine whether an entity's involvement in resolving issue 105U should be revoked and/or an entity 136A-n should be added to the group of entities to resolve issue 105U.

At 200-10, recommend entity component 140, based on review of conversation 126A, determines that a sub-issue has arisen which entity 136A may be able to resolve. Accordingly, recommend entity component 140 recommends that entity 136A rejoins the group of entities (e.g., entities 136B and 136C) assigned to resolving issue 105U. Entity 136A is re-tasked in assisting with resolving issue 105U.

At 200-11, as previously mentioned, for a time period that entity 136A was not engaged in resolving issue 105U, a summary component 150 can be configured to identify activity/content generated (e.g., in conversation between entities 136B and 136C) which entity 136A is unaware. Based on the unobserved activity/content, summary component 150 can be configured to generate a summary 152A having content enabling entity 136A to be quickly brought up to speed regarding what is going on with resolving issue 105U. Further, based on knowing the role/expertise of entity 136A, summary component 150 can be further configured to generate the summary 152A such that the summary 152A is tailored to entity 136A, e.g., portions of the summary that specifically pertain to entity 136A can be highlighted, portions of the summary that do not pertain to entity 136A can be omitted, and suchlike.

At 200-12, entity 136A rejoins the group of entities (e.g., entities 136B and 136C), with further activity (e.g., further conversation 126A, other conversation 126B-n, further threads 127A-n, and suchlike being generated, which can be further reviewed by recommend entity component 140, revoke entity component 145, compiled by conversation component 120, and suchlike. Accordingly, entities 136A-n can be engaged/brought onboard to resolve issue 105U and/or revoked from resolving issue 105U.

At 200-13, per the forgoing, issue 105U becomes resolved as resolved issue 105R. In an embodiment, the prior issues data 138A-n can be updated (e.g., by issues component 139, initial entity component 135, a data update component, and suchlike) with the various activities, conversations 126A-n, etc., undertaken by the respective entities 136A-n engaged in resolved issue 105R. The updated prior issues data 138A-n can be used when assigning entities 136A-n to a future unresolved issue 105.

Figure 3:
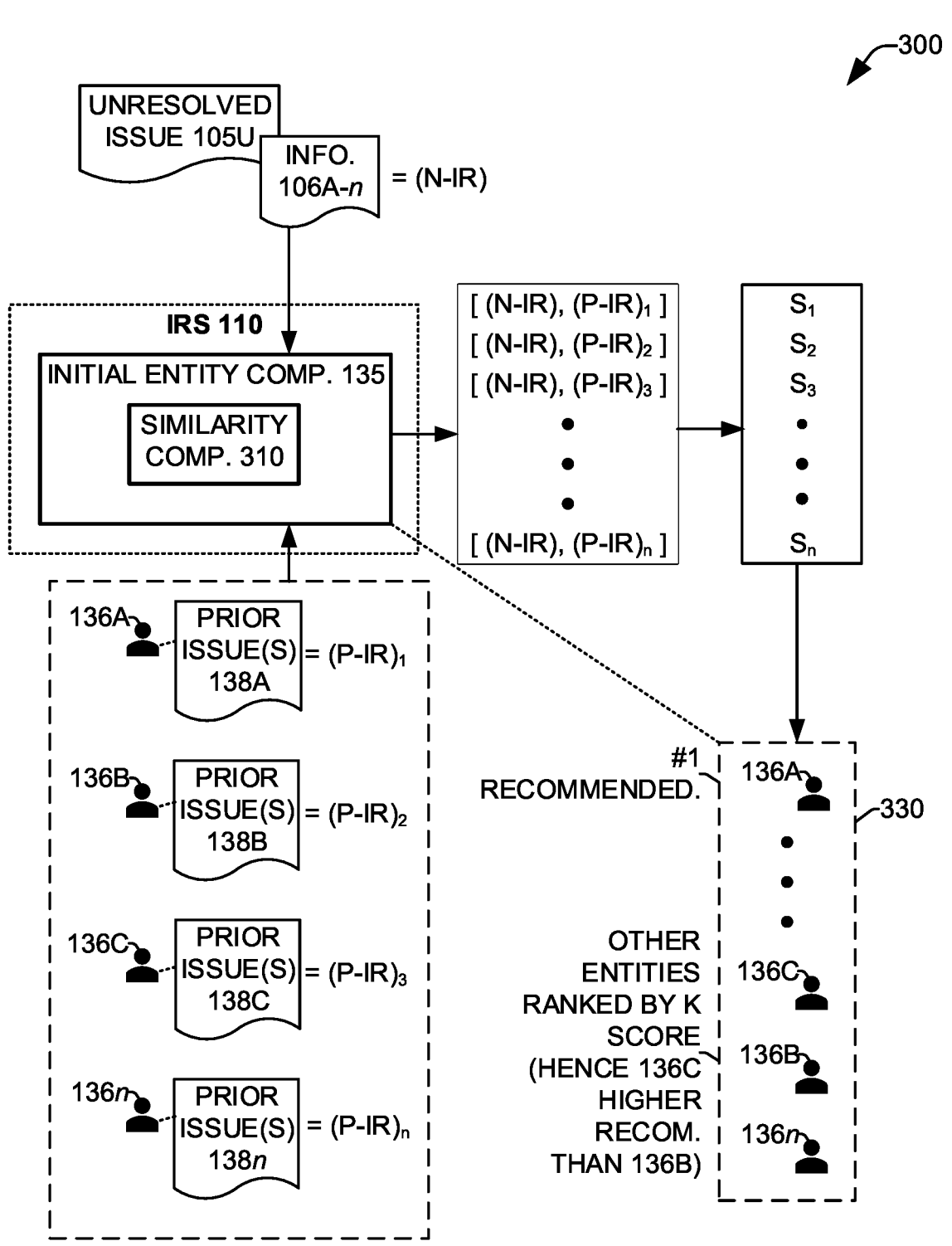
FIG. 3 presents a schematic illustrating operation of respective components to automatically identify and recommend one or more entities to initiate resolving an issue, in accordance with one or more embodiments.

Turning to FIG. 3, schematic 300 illustrates operation of respective components to automatically identify and recommend one or more entities to initiate resolving an issue, in accordance with one or more embodiments. As previously mentioned, IRS 110 can include an initial entity component 135 configured to review data/information 106A-n pertaining to an unresolved issue 105U and further identify/recommend one or more entities 136A-n to initiate a process to resolve issue 105U. Initial entity component 135 can be communicatively coupled to the IRC 115, wherein IRC 115 can be configured to utilize initial entity component 135 to initiate assignment of resolving issue 105U to the respective initial entities 136A-n. IRC 115 can be configured to employ initial entity component 135 based on, for example, receipt of information 106A-n (e.g., from an external source, or internally generated), receipt of a notification (not shown) that an issue 105U has been detected/identified, and suchlike. In an embodiment, the initial entity component 135 can include a similarity component 310 configured to determine/identify how closely one or more items of content in the information data 106A relates to prior issues 138A-n that respective entities 136A-n were previously involved with. The similarity component 310 can be configured to determine similarity based on text, semantics, textual summarization, etc., between various items of interest (e.g., pairings of current issue information 106A-n and prior issues information 138A-n). In an example embodiment, similarity component 310 can be a bidirectional and auto-regressive transformer (BART) model architecture, however, it is to be appreciated than any suitable model/AI technology/AI architecture can be utilized to identify entities 136A-n to be assigned in resolving issue 105U as a function of prior issues 138A-n the respective entities 136A-n have worked on.

As shown in FIG. 3, information 106A-n pertaining to the unresolved issue 105U can be compared with data pertaining to the prior issues 138A-n that the respective entities 136A-n have been involved with. Information 106A-n pertaining to the unresolved issue 105U is identified in FIG. 3 as N-IR (new issue report), while data pertaining to prior issues 138A-n is identified as P-IR (prior issue report), such that information 106A-n in prior issues 138A associated with entity 136A is identified as $P\text{-}IR_1$, data in prior issues 138B associated with entity 136B is identified as $P\text{-}IR_2$, data in prior issues 138C associated with entity 136C is identified as $P\text{-}IR_3$, data in prior issues 138n associated with entity 136n is identified as $P\text{-}IR_n$, and suchlike. It is to be appreciated that the PI-R data pertaining to prior issues 138A-n can comprise of a single prior issue/incident that an entity 136A-n was previously involved with, or numerous prior issues that an entity 136A-n was previously involved with. For example, P-IR$_1$ may comprise of a single prior issue or numerous prior issues for entity 136A.

As shown in FIG. 3, similarity component 310 can be configured to compare content in the respective n pairs of new issue reports and prior issue reports (e.g., N-IR versus P-IR$_{1-n}$), and further provide a similarity score S$_1$-S$_n$ for the respective pairings N-IR:P-IR$_1$, N-IR:P-IR$_2$, N-IR:P-IR$_3$ . . . N-IR:P-IR$_n$. As further shown in FIG. 3, the similarity component 310 can be further configured to use the similarity scores S$_1$-S$_n$ to generate a ranking 330 (e.g., a "k" ranking) of the similarity of the respective pairings N-IR:P-IR$_1$, N-IR:P-IR$_2$, N-IR:P-IR$_3$ . . . N-IR:P-IR$_n$, and based thereon, identify one or more entities 136A-n having prior experience that potentially/directly pertains to unresolved issue 105U can be assigned by the initial entity component 135 to resolving issue 105U (e.g., per FIG. 2, act 200-2). For example, an entity 136F having the highest the similarity score S$_F$ is recommended over an entity 136D having a lower similarity score S$_D$, such that first content in the N-IR matches second content in P-IR$_D$.

Figure 4:
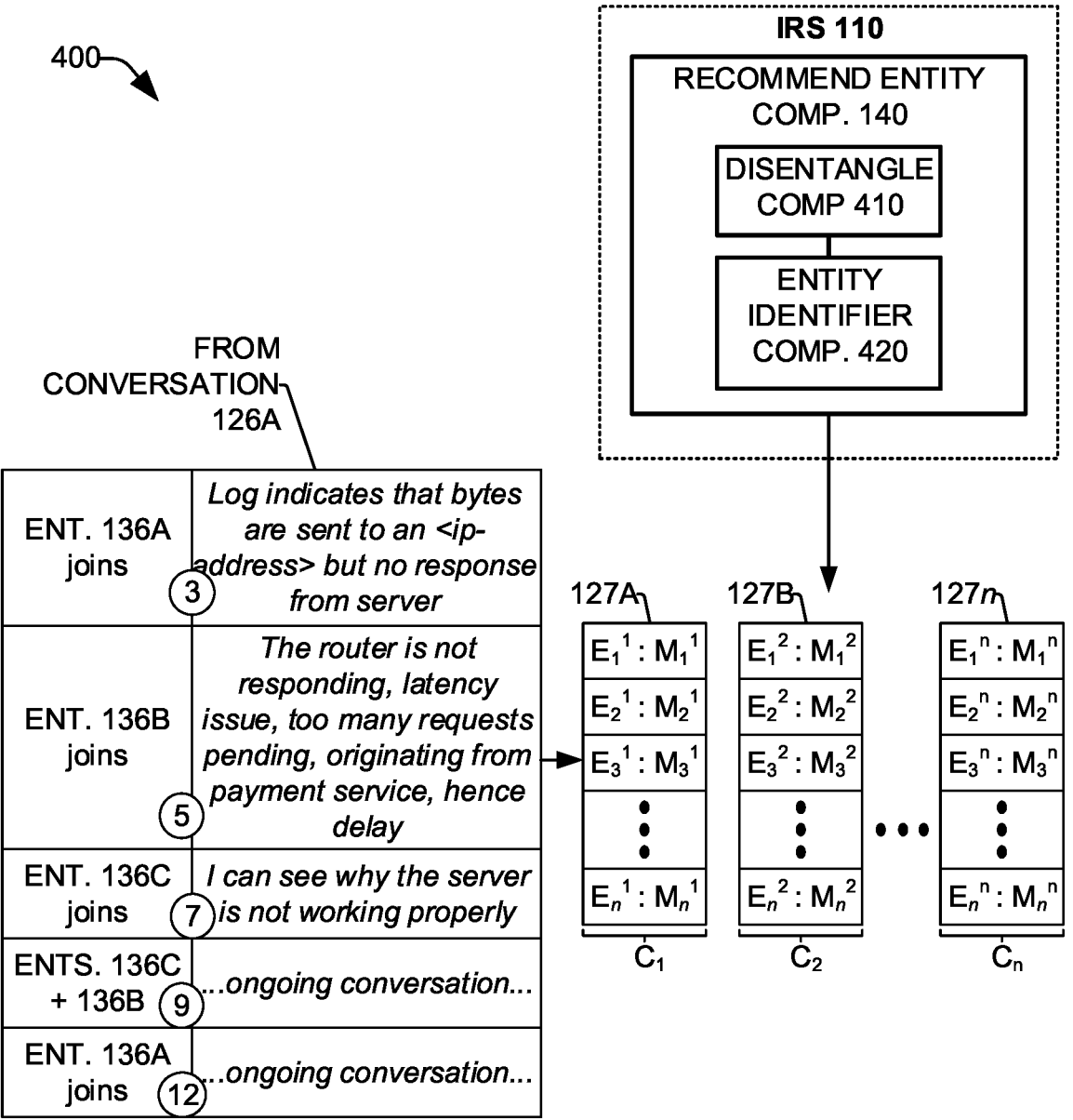
FIG. 4 presents a schematic illustrating operation of respective components to automatically recommend addition of one or more entities to resolve an issue, in accordance with one or more embodiments.

Turning to FIG. 4, schematic 400 illustrates operation of respective components to automatically recommend addition of one or more entities to resolve an issue, in accordance with one or more embodiments. As previously mentioned, IRS 110 can include a recommend entity component 140 configured to review conversations 126A-n and respective interactions between one or more entities 136A-n currently (or previously) involved with resolving issue 105U, and based thereon, the recommend entity component 140 can be further configured to identify/recommend one or more entities 136A-n to join a group of entities in resolving issue 105U. Recommend entity component 140 can be communicatively coupled to the IRC 115, wherein IRC 115 can be configured to utilize recommend entity component 140 as the respective conversation 126A-n is generated and added to/develops. For example, as entity 136A generates a comment in conversation 126A-n regarding issue 105U, the recommend entity component 140 can be configured to automatically parse the new comment to identify/determine whether another entity, e.g., entity 136B, should be brought onboard to assist in resolving issue 105U.

As shown in FIG. 4, a conversation 126A has been generated, for example, based on conversation component 120 capturing respective comments/statements/actions performed by various entities 136A-n involved in resolving issue 105U. The example statements presented in FIG. 4 are taken from the example conversation 126A depicted in FIG. 2. While the example presented for conversation 126A is simple and includes few statements, it is to be appreciated that conversation 126A can be highly complex and comprise of many statements, content, actions, comments, etc., generated by, or pertaining to, actions, etc., performed by respective entities 136A-n in resolving issue 105U. Accordingly, given that conversation component 120 may compile/generate a conversation 126A from numerous sources/data/comments/etc., conversation 126A can comprise of multiple threads 127A-n (further labeled C$_1$-C$_n$ below) of conversation topics/themes/subjects/etc. For example, conversation 126A may include a discussion (e.g., captured by conversation component 120) between two entities 136A and 136B regarding operation of a router associated with issue 105U, while another discussion between entities 136A and 136C regards how the electronic payments are processed.

As further shown, the recommend entity component 140 can further include a conversation disentangle component 410, wherein, the conversation disentangle component 410 can be configured to review/parse the entirety of conversation 126A captured/compiled by conversation component 120, and further identify/extract the respective threads 127A-n of respective subject matters in conversation 126A. The conversation disentangle component 410 can utilize any suitable technology, e.g., AI/ML techniques, algorithm(s), a model, architecture, etc., to enable the respective threads 127A-n to be identified/disentangled.

In the example scenario shown in FIG. 4, the conversation disentangle component 410 has identified various conversation threads 127A-n, wherein the respective threads 127A-n are identified as C$_1$, C$_2$ . . . C$_n$ in FIG. 4. Further, each conversation thread C$_1$, C$_2$ . . . C$_n$ is further presented as a series of entity E$_{1-n}$ and message pairings M$_{1-n}$, with each message in a respective conversation thread is a reply/response to a previous message, e.g., M$_2$ is a response by an entity to M$_1$, M$_3$ is a response by an entity to M$_2$, etc.

Context for each thread 127A-n/C$_1$, C$_2$ . . . C$_n$ is generated/based on the respective response and message pairings. For example, context for recommendation of an entity $\{E_3{}^i\}$ is based on prior entity and message pairings [(E$_1{}^i$, E$_2{}^i$), (M$_1{}^i$, M$_2{}^i$)].

In an embodiment, for each conversation thread C$_i$, the total number of context response pairings={(Total number of messages M$_{1-i}$ in C$_i$)−1, hence the total number of response pairings is one less than the total number of messages M$_{1-n}$ in a particular thread.

Once the various threads 127A-n/C$_{1-n}$ and the respective entity E$_{1-n}$ and message M$_{1-n}$ pairings have been identified, the various threads 127A-n/C$_{1-n}$ can be applied to an AI architecture that has been previously trained with prior conversations 126A-n and threads 127-n. As further described, the same AI architecture can be utilized to create entity identifier component 420 and also a revoke component (entity identifier component 530). Accordingly, the goal of training of AI architecture to form the entity identifier component 420 is to identify an entity 136A-n (e.g., entity E$_3$) to be recommended and engaged in resolving issue 105U. Hence, based on training with prior instances of conversations 126A-n and threads 127A-n/C$_{1-n}$, the recommend entity component 140 (e.g., operating as a trained recommend entity model) can subsequently identify/recommend one or more entities 136A-n to join the group of entities resolving issue 105U.

Per the foregoing, FIG. 4 illustrates how an AI architecture can be trained to create an entity identifier component 420, and further, how threads 127A-n of a currently ongoing conversation 126A can be disentangled from the conversation 126A and an entity 136A-n can be identified from a prior sequence of resource and message pairings. Hence, when a current conversation 126A is applied to the previously trained entity identifier component 420, the entity identifier component 420 identifies an entity 136A-n based on the various threads 127A-n in a current conversation 126A in conjunction with the respective entity E$_{1-n}$, and message M$_{1-n}$ pairings.

Figure 5:
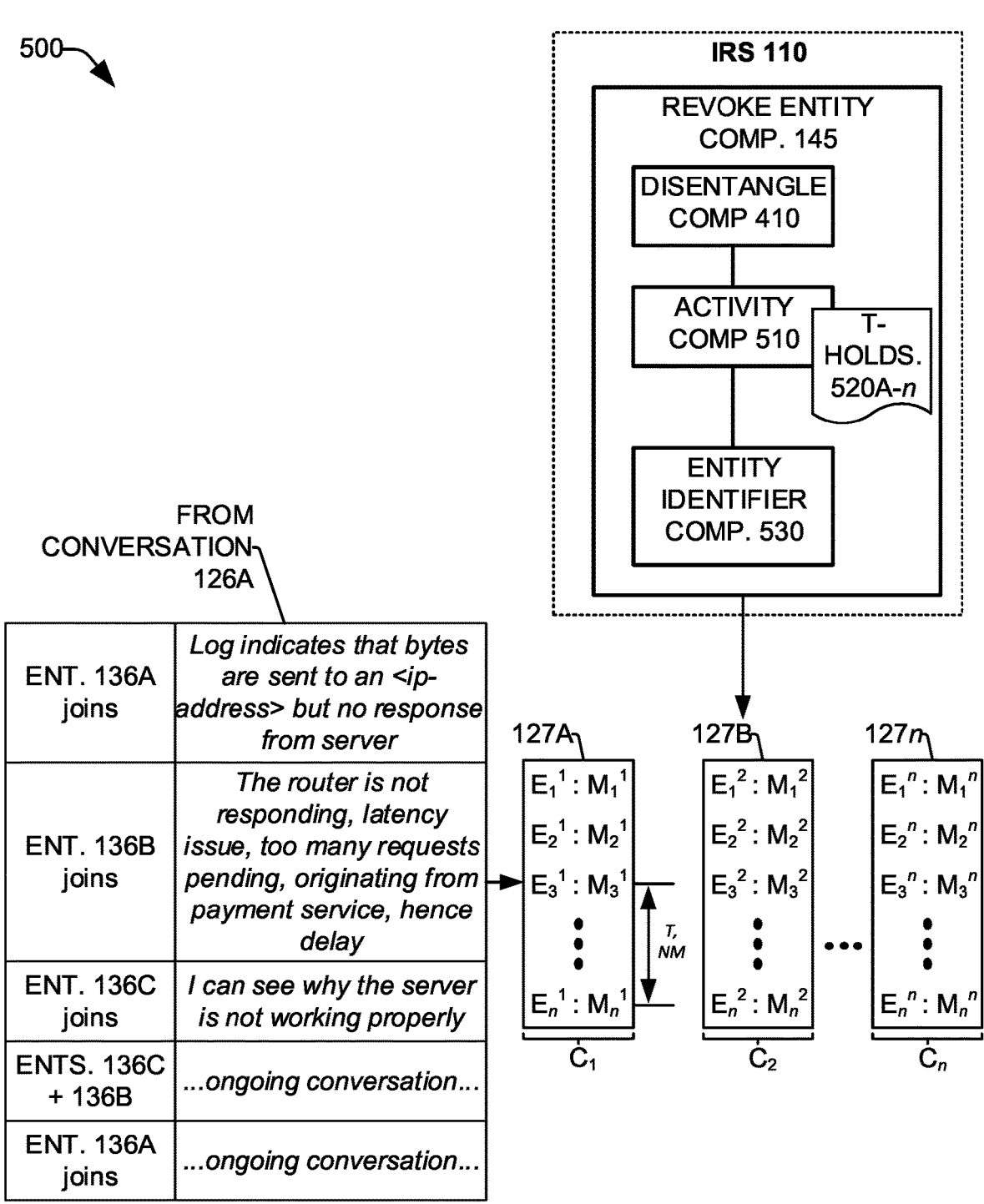
FIG. 5 presents a schematic illustrating operation of respective components to automatically identify and revoke involvement of one or more entities in resolving an issue, in accordance with one or more embodiments.

As previously mentioned, the same underlying architecture can be utilized to create the recommend entity component 140 and the revoke entity component 145. FIG. 5, schematic 500, illustrates operation of respective components to automatically identify and revoke involvement of one or more entities in resolving an issue, in accordance with one or more embodiments.

As previously described in FIG. 4, various threads 127A-n can be disentangled from a conversation 126A-n, such that one or more entities 136A-n can be identified as potentially being useful in resolving issue 105U, with recommend entity component 140 being configured to automatically identify and recommend the determined entity 136A-n. In an alternative application, a revoke entity component 145 can also use determined information regarding one or more entities 136A-n to identify the respective entity is no longer taking part in resolving issue 105U, and hence, the revoke entity component 145 can be configured to remove the identified entity from the project of resolving issue 105U.

FIG. 5, schematic 500 depicts an example process/operation for conversion of respective words/statements into a mathematical representation enabling the respective recommend and revoke operations to be performed, in accordance with one or more embodiments.

Per the foregoing description regarding identifying respective entities 136A-n in a conversation 126A, an entity 136A-n who has previously been involved in the project of resolving issue 105U but who is no longer engaged in the project (e.g., their particular skill/knowledge does not pertain to an ongoing situation regarding issue 105U), the entity 136A-n can be identified and removed from the group of entities 136A-n resolving issue 105U.

In an embodiment, the revoke entity component 145 can be configured to identify the last message/action an entity, e.g., entity 136A, was associated with (e.g., entity 136A posted the message). In an embodiment, the revoke entity component 145 can include an activity component 510 in conjunction with the previously mentioned conversation disentangle component 410. As previously mentioned, the conversation disentangle component 410 can be configured to identify/disentangle respective threads 127A-n/C1-Cn in the conversation 126A. The activity component 510 can be configured to identify the last message/activity that involved entity 136A, and further identify the most recent message/activity in the conversation 126A. The activity component 510 can be configured to further determine a time T from the last message posted (e.g., $E_3^1:M_3^1$ was last message posted by entity 136A) and the most recent message in the conversation 126A (e.g., entity 136A was not involved in messages through to $E_n^1:M_n^1$) and/or a current time.

Further, the activity component 510 can be assigned an activity threshold 520, wherein the activity threshold 520 is a defined period of time against which activity of an entity 136A-n is measured. Accordingly, and in the event of the time T is equal to, or greater than, a value of activity threshold 520, the revoke entity component 145 can be configured to revoke engagement/interaction of entity 136A with the project, where time T relates to activity of entity 136A.

In another embodiment, a count of messages NM from the identified message ($E_3^1:M_3^1$) to a subsequent message (e.g., latest/last message $E_n^1:M_n^1$ in conversation 126A-n) can be determined by the revoke entity component 145, and in the event of the message count NM is equal to, or greater than, a defined message count (e.g., where threshold 520D is a message count threshold) the revoke entity component 145 can be configured to revoke engagement/interaction of entity 136A with the project. It is to be appreciated that any suitable method/technique can be utilized to determine a lack of engagement of an entity 136A-n with the project, e.g., time, message count, and suchlike.

With regard to identifying an entity 136A-n, the recommend entity component 140 can include an entity identifier component 420 and revoke entity component 145 can include an entity identifier component 530, whereby operation of the entity identifier components 420/530 is further described with reference to FIGS. 6 and 7.

Figure 6:
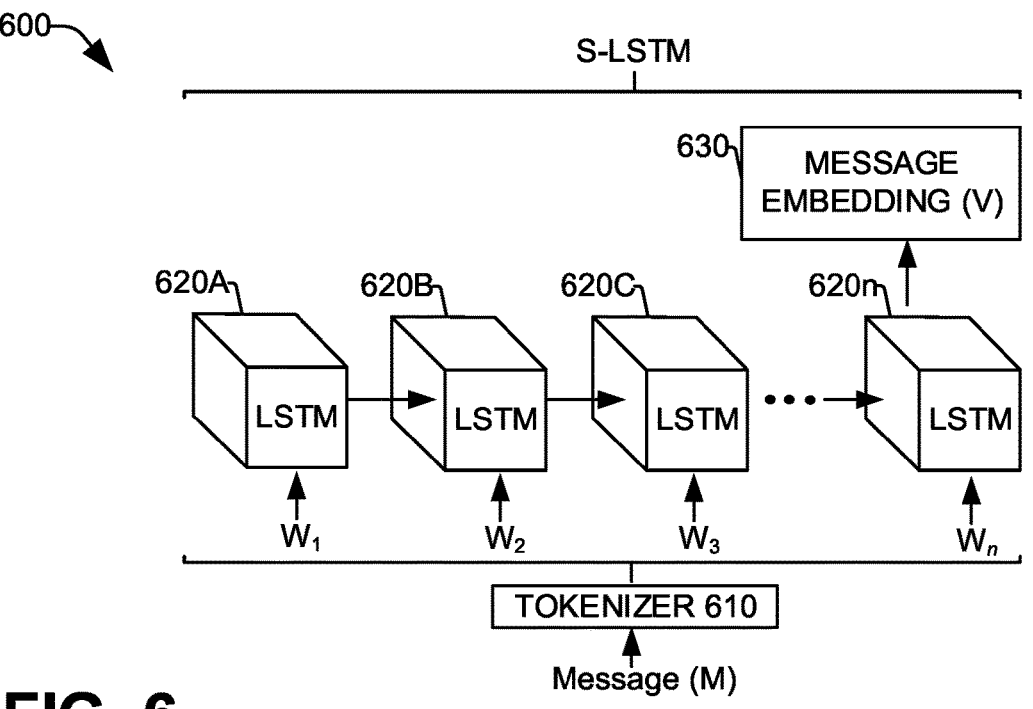
FIG. 6 is a schematic illustrating processing of one or more messages with associated entities as part of a respective recommend entity/revoke entity operation, in accordance with one or more embodiments.
Figure 7:
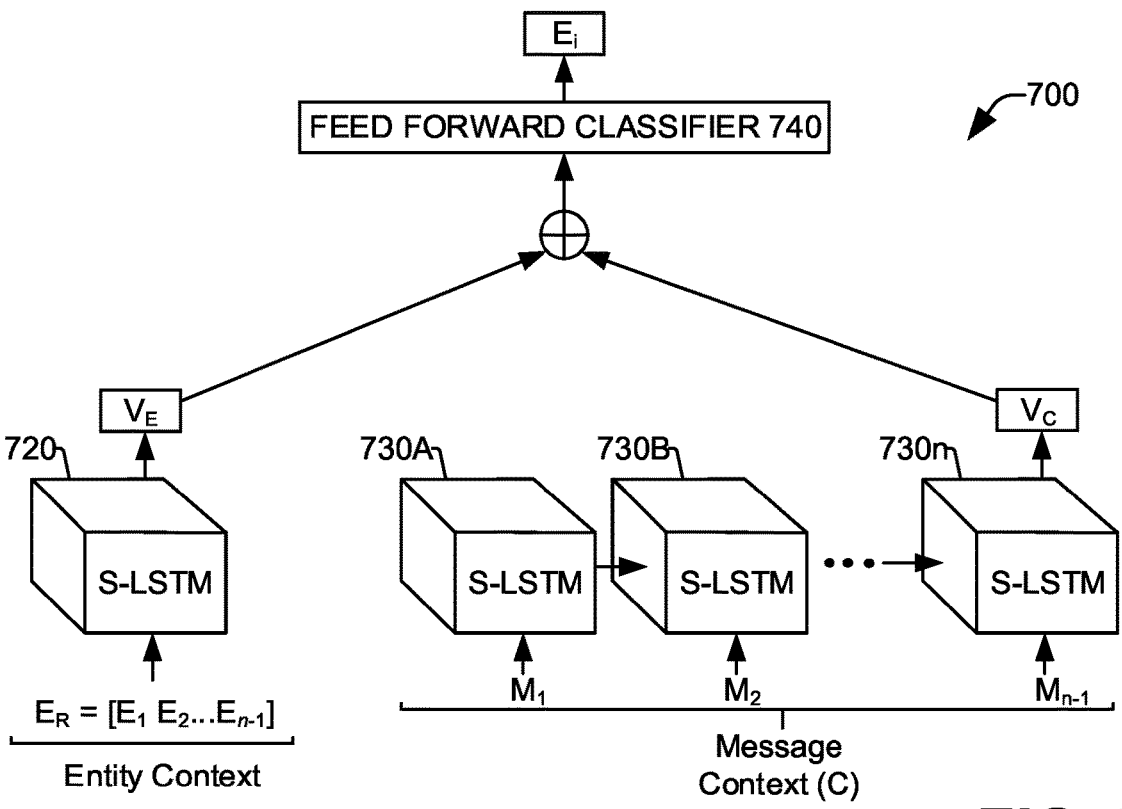
FIG. 7 is a schematic illustrating processing of one or more messages with associated entities as part of a respective recommend entity/revoke entity operation, in accordance with one or more embodiments.

FIGS. 6 and 7 present schematics of example operations for mathematically representing conversations/messages/threads and entities to enable similarity analysis, and suchlike to be performed, e.g., by the recommend entity component 140 and/or the revoke entity component 145.

FIG. 6, schematic 600, illustrates processing of one or more messages with associated entities as part of a respective recommend entity/revoke entity operation, in accordance with one or more embodiments. As shown, a message M (e.g., where message M is included in conversations 126A-n/threads 127A-n) is processed by a tokenizer 610 (or other applicable operation/processing) configured to separate a statement (e.g., an utterance/digital entry made by an entity 136A in a conversation 126A) into respective words W1-n. In an example embodiment, the tokenizer 610 can be further configured to apply the respective word to a long short term memory network (LSTM) operation(s) 620A-n and a message embedding component 630 can be configured to combine the respective LSTM values for the respective words W1-n in the statement to create an embedded value V, wherein V is a mathematical representation (e.g., vector representation) of message M.

FIG. 7, schematic 700, illustrates processing of one or more messages with associated entities as part of a respective recommend entity/revoke entity operation, in accordance with one or more embodiments. As further shown, the respective entities 136A-n can also be mathematically represented in a sequence of entities $E_R=[E_1 \ E_2 \ . \ . \ . \ E_{n-1}]$, wherein $E_R$ is an entity context (also known as a resource context) for the entities 136A-n involved in generating a series of messages (e.g., in conversation 126A-n, threads 127A-n). $E_R$ can be applied to a sentence state LSTM (S-LSTM) 720 (or other applicable operation/processing) to generate $V_E$, where $V_E$ is a mathematical representation (e.g., vector representation) of the respective entities 136A-n involved in generating the messages $M_{1-n}$ in conversation 126A-n/threads 127A-n of concern.

As further shown, the respective messages $M_{1-n}$ generated by the respective entities 136A-n in one or more threads 127A-n of concern in conversation 126A-n can be processed to generate a mathematical representation $V_C$ (e.g., vector representation) of the respective message context $M_1$, $M_2 \ . \ . \ . \ M_{n-1}$. As shown, respective S-LSTM processes 730A-n (or other applicable operation/processing) can be configured to sequentially combine the message contexts $M_1, M_2 \ . \ . \ . \ M_{n-1}$ to generate $V_C$.

As further shown, the mathematical representations $V_E$ (entities) and $V_C$ (message contexts) can be applied to a feed forward classifier 740 (or other applicable operation/processing) configured to generate $E_i$, wherein $E_i$ represents the entity 136A-n that can be either automatically recommended (e.g., where the operations depicted in FIGS. 6 and 7 form part of the entity identifier component 420 in the recommend entity component 140) to be added to the group of entities 136A-n working to resolve issue 105U, or to automatically revoke (where the operations depicted in FIGS. 6 and 7 form part of the entity identifier component 530 in the revoke entity component 145) the entity from the group of entities 136A-n who are currently in the project tasked with resolving issue 105U.

As previously mentioned, a first entity (e.g., entity 136H) can join an ongoing process to resolve an issue 105U, and further, a second entity (e.g., entity 136R) that was previously assisting with resolving issue 105U but was subsequently revoked can rejoin the project.

Figure 8:
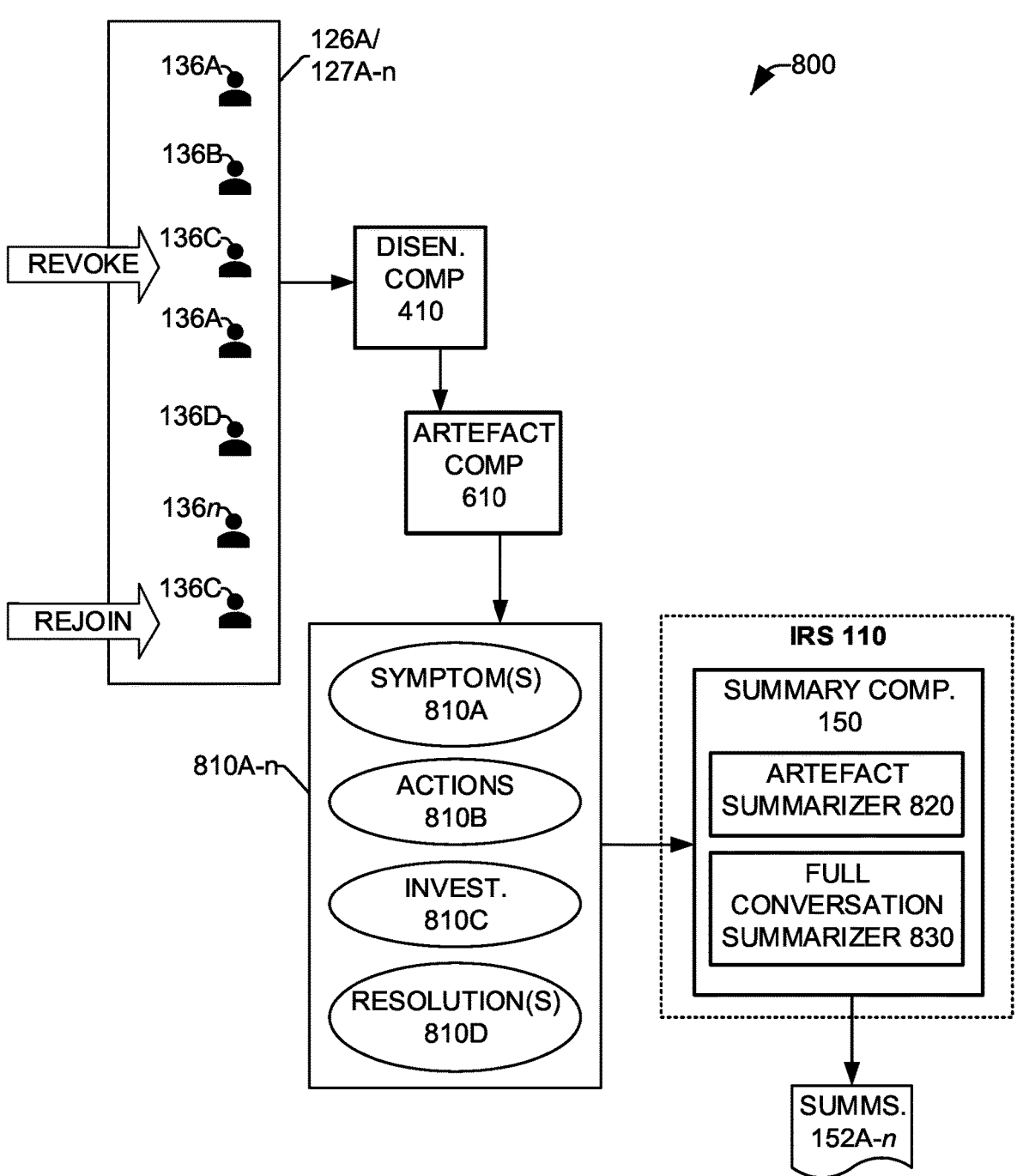
FIG. 8 is a schematic illustrating summary generation for an entity, in accordance with an embodiment.

FIG. 8, schematic 800 illustrates summary generation for an entity, in accordance with an embodiment. As shown, with reference to FIG. 1, a summary component 150 can be communicatively coupled to the recommend entity component 140 and/or a revoke entity component 145, and further communicatively coupled to IRC 115. A summary component 150 can be configured to determine a period of time for which the entity 136R or 136H was not involved in the project and further configured to generate a summary 152A-n comprising the unobserved content. The summary component 150 can further include an artefact summarizer 820 configured to summarize various artefacts 810A-n. The summary component 150 can further include a full conversation summarizer 830 configured to generate a summary 152A-n compiled from the respective artefacts 810A-n and in a further embodiment, generate the summary 152A-n tailored to a role/requirement of the receiving entity 136A-n.

As previously mentioned, a conversation 126A can comprise of multiple threads 127A-n (e.g., subject matter, topics, etc.) whereby the threads 127A-n can be further sorted/presented as artefacts 810A-n such as (a) symptoms 810A pertaining to issue 105U, (b) actions 810B performed by the respective entities 136A-n in resolving the issue 105U, (c) investigation(s) 810C performed by the respective entities 136A-n in resolving the issue 105U, (d) any identified resolutions 810D, and suchlike. The summary component 150 can generate a summary 152A-n comprising one or more summaries of the respective threads 127A-n for the time period that the entity 136A-n was not present on the project. For example, for an entity 136H who was not present on the project, but is being brought in when the resolution of issue 105U is underway. In another example, entity 136R was initially involved in the project, later was revoked from the project (e.g., by revoke entity component 145), and is rejoining the project (e.g., by recommend entity component 140).

Hence, a summary 152H for entity 136H would provide a summary of the various threads 127A-n from the initiation of the project through to the moment that entity 136H joined the project, while a summary 152R would provide a summary of the various threads 127A-n for the time period during which entity 136R was revoked from the project. The role/knowledge of the respective entity 136A-n to receive the respective summary 152A-n can be provided to the summary component 150 enabling the summary component 150 to tailor/personalize the respective summary 152A-n to the focus of the receiving entity 136A-n.

In an embodiment, the summary component 150 can include a large language model (LLM) or similar component configured to summarize the respective messages $M_1$-» in a particular thread, as well as, across the collection of threads 127A-n pertaining to resolving issue 105U. In an embodiment, the summary 152A-n can have multiple levels of content, for example, each of the threads 127A-n/artefacts 810A-n can be individually summarized, and further, a summary provided that combines the respective threads 127A-n/artefacts as a single summary 152A-n.

It is to be appreciated that the various operations presented throughout this disclosure are merely examples of respective AI and ML operations and techniques, any suitable technology can be utilized in accordance with the various embodiments presented herein, including, in a non-limiting list, any of a LSTM, a deep learning algorithm, a sequential neural network, a sequential neural network that enables persistent information, a recurrent neural network (RNN), a bidirectional encoder representation from transformers (BERT) model, a bidirectional and auto-regressive transformer (BART) model, a convolutional neural network (CNN), a neural network, capsule network, a machine learning algorithm, a natural language processing (NLP) technique, sentiment analysis, bidirectional LSTM (BiLSTM), stacked BiLSTM, and suchlike. For example, per FIGS. 4 and 5, operation of the respective recommend and revoke components/models are simply examples of how the respective content of conversations 126A-n and entities 136A-n associated with them can be mathematically represented and processed to enable the recommend and/or revoke operations to be undertaken. Accordingly, any suitable operation/technique/technology can be utilized to facilitate any of the respective operations/processes presented herein. For example, any suitable operation/technique/technology can be utilized to facilitate automated identification of one or more entities 136A-n as part of the automated recommend or revoke operations. Furthermore, while the recommend model and the revoke model depicted herein are depicted as using the same underlying mathematical approaches, the various embodiments are not so limited with the recommend model and the revoke model utilizing disparate techniques.

Language models, LSTMs, BARTs, etc., can be formed with a neural network that is highly complex, for example, comprising billions of weighted parameters. Training of LSTMs can be conducted with datasets, whereby the datasets can be formed using any suitable technology, such as the issues component 139 generating the prior issues information 138A-n for the respective entities (for use by the recommend entity component 140/revoke entity component 145, summary component 150, initial entity component 135, conversation component 120, and suchlike), conversation component 120 compiling conversations 126A-n, and suchlike. The datasets can be available from many sources, e.g., collected by the IT enterprise, provided by a client, provided by a third party, and suchlike. Further, the datasets can comprise text, alphanumerics, numbers, single words, phrases, short statements, long statements, images, audio, etc. Fine-tuning of a LM can comprise application of a dataset to the LM, the LM is correspondingly adjusted by application of the dataset, such that, for example, weightings in the LM are adjusted by application of the dataset.

FIG. 9, methodology 900, illustrates a computer-implemented methodology for automatically assigning entities to and/or removing entities from a project to resolve an issue, according to one or more embodiments.

At 910, data/information regarding prior issues (e.g., prior issues 138A-n) that one or more entities (e.g., any of entities 136A-n) have previously worked on/been involved with can be compiled by an issues component (e.g., issues component 139) and stored (e.g., in database/memory 184). As previously mentioned, the issues component can reside and operate from within an issue resolution system (e.g., IRS 110)/in one of the communicatively coupled components included within the IRS, or the issues component can reside and operate external to the IRS.

At 920, data/information regarding an unresolved issue (e.g., unresolved issue 105U) can also be compiled by the issues component and stored (e.g., as information 106A-n in memory 184).

At 930, the content of the unresolved issue information can be reviewed to determine whether one or more of the entities had previously worked on one or more issues relating to the unresolved issue. For example, an initial entity component (e.g., initial entity component 135) can review the unresolved issue information issue and extract one or more content (e.g., elements, actions, parameters, activities, and suchlike), regarding the unresolved issue. The one or more content can be compared to one or more content in the prior issues that the respective entities were involved with. In the event of an entity has been involved in a prior issue that has similarity to the currently unresolved issue (e.g., first content pertaining to the unresolved issue matches/is similar to second content pertaining to the currently unresolved issue), the initial entity component can be configured to automatically select the identified entity and assign the entity to resolving the unresolved issue, wherein the identified entity can operate as an individual or as part of a group/team initially assembled to address the unresolved issue.

At 940, as one or more entities work to resolve the issue, a conversation component (e.g., conversation component 120) can be configured to compile the various emails, statements, utterances, activities, etc., the one or more entities generate/perform while working to resolve the issue, wherein the various emails, activity statements, actions, etc., can be compiled in a conversation (e.g., conversation 126A) pertaining resolving the issue.

As previously mentioned, the conversation can comprise of various threads of conversation (e.g., threads 127A-n) regarding different subjects/topics pertaining to the unresolved issue. A conversation disentangle component (e.g., conversation disentangle component 410) can be configured to identify and extract/disentangle the various threads from the conversation, wherein the threads can be utilized to recommend an entity to/remove an entity from the project. As previously mentioned, location and/or implementation of the disentanglement component can be at any of the conversation component, in a recommend entity component (e.g., recommend entity component 140), and/or a revoke entity component (e.g., revoke entity component 145).

At 950, as previously mentioned, the recommend entity component can be configured to analyze the respective threads to automatically identify an entity having skills that may be applicable to a current sub-issue/activity in resolving the issue. The recommend entity component can be configured to recommend an entity based on a comparison and match of content of the one or more threads with the prior issues information for the respective entities.

At 960, when an entity is assigned to assist in resolving the issue, a summary component (e.g., summary component 150) can be configured to determine a period of resolution of the ongoing issue for which the entity was not present. The summary component can be further configured to generate a summary (e.g., summary 152A-n) for the entity, wherein the summary provides a summary of various communications, actions, etc., performed during the period of issue resolution which the entity was not present. The summary can be tailored to the needs of the entity, e.g., the entity's skill set, to enable the entity to be quickly brought up to speed regarding the current state of the issue resolution and work performed to date in attempting to resolve the issue.

At 970, as previously mentioned, concurrent to the recommend entity component functioning to identify/recruit one or more entities to assign to the project, the revoke entity component can be configured to analyze the respective threads to automatically identify an entity who is no longer engaged in resolving the issue, even though the entity is currently assigned to resolving the issue. The revoke entity component can be configured to remove an entity based on identifying a duration (e.g., measured based on time T, measured based on volume of messages NM, etc.) for which the entity has not been engaged in the project, whereby the duration exceeds a defined value (e.g., a threshold 520A-n).

At 980, a determination can be made regarding whether the unresolved issue has been resolved (e.g., to become resolved issue 105R). In response to a determination that NO, the issue has not been resolved, methodology 900 can advance to 990 for further analysis of the unresolved issue to be performed and further return to 940 with further addition/removal of entities to the project.

Further, at 980, in response to a determination that YES, the issue has been resolved, methodology 900 can advance to 995, whereupon the respective activities, conversations, issues, etc., can be respectively compiled for the respective entity's involvement in the project, with the prior issues database (e.g., prior issues 138A-n) being updated (e.g., by issues component 139) with the entity's involvement in resolving the issue. Accordingly, with the prior issues database being updated, the updated information can be utilized to determine one or more initial entities and/or recommend entities to resolve a future issue.

FIG. 10, methodology 1000, illustrates a computer-implemented methodology for automatically initially assigning entities to a project to resolve an issue, according to one or more embodiments.

At 1010, information can be received at a system (e.g., by IRS 110, issues component 139, and suchlike) regarding a current issue (e.g., unresolved issue 105U). In an embodiment, the current issue can be an operational event in an information technology system.

At 1020, the current issue information can be parsed (e.g., by issues component 139) to identify content, actions, etc., which can be performed by various entities (e.g., any of entities 136A-n) having respective skillsets/knowledge regarding resolving an issue.

At 1030, prior issues (e.g., prior issues 138A-n) can be obtained by an initial entity component (e.g., initial entity component 135), wherein the prior issues have associated activities/utterances/conversations/etc., performed by respective entities (e.g., any of entities 136A-n) during resolving a prior issue(s), wherein the respective entities are available to address/resolve the current issue.

At 1040, the initial entity component can be configured to parse the current issue and the prior issues to identify/generate one or more pairings between current issue information in the current issue and prior issue information in the prior issues. As previously described, first data (e.g., N-IR, new issue report in information 106A) in the current issue information can be paired with respective second data (e.g., $\text{P-IR}_{1-n}$, prior issue reports in prior issues 138A-n) in the prior issue information associated with the respective entities.

At 1050, respective similarities between the current issue information and the prior issue information can be determined by a similarity component (e.g., similarity component 310). In an embodiment, vector representation can be utilized to represent the respective current issue information and prior issue information pairings $\text{N-IR:P-IR}_{1-n}$.

At 1060, based on the respective vector proximity between the respective pairings $\text{N-IR:P-IR}_{1-n}$, respective similarity scores (e.g., K scores) can be generated for each of the pairings.

At 1070, the pairings $\text{N-IR:P-IR}_1$, can be ranked (e.g., as ranking 330) by the similarity component based on their respective similarity score (e.g., $S_1\text{-}S_n$), and further, the respective entity associated with each pairing identified by the similarity component. Accordingly, the likelihood of an individual entity's skillset in resolving the issue can be determined based on the entity's respective placing in the ranked similarity scores. For example, a high similarity score for a pairing indicates the entity associated with the pairing will likely have a skill(s) applicable to resolving the current issue, while a low similarity score for a pairing indicates the entity associated with the pairing will likely have few, if any, skills applicable to resolving the issue.

At 1080, the initial entity component can be further configured to recommend an entity with the highest (or higher) similarity score is initially assigned to assist in resolving the current issue.

FIG. 11, methodology 1100, illustrates a computer-implemented methodology for automatically recommending/assigning an entity to a project to resolve an issue, according to one or more embodiments.

At 1110, a conversation component (e.g., conversation component 120) can be configured to compile ongoing activity/utterances/digital conversation/digital input/entries conducted in resolving a current issue and further generate a conversation (e.g., as conversation 126A-n) from the compiled information. The conversation component can be configured to continually update the conversation as new activity/inputs are generated/received.

At 1120, the conversation can be disentangled by a conversation disentangle component (e.g., conversation disentangle component 410) to identify one or more threads (e.g., threads 127A-n) included in the conversation, wherein the one or more threads can be respectively associated with various topics, subject matter, etc., as previously described.

At 1130, the threads can be applied to a recommend entity component (e.g., recommend entity component 140), wherein the recommend entity component can have undergone prior training with one or more datasets comprising sequences of utterances, actions, and the like, between respective entities as an issue is being resolved. By training the recommend entity component with the one or more datasets, the recommend entity component (e.g., a mathematical model) can be configured to predict a subsequent entity based on the prior sequence of the respective utterances and the respective entity that generated them.

At 1140, based on the prior training of the recommend entity component, the recommend entity component can be configured to recommend the entity identified in the current conversation/threads as a function of the training dataset regarding prior utterances, etc., and the entity that created them.

At 1150, the recommended entity can be assigned to the project of resolving the issue.

FIG. 12, methodology 1200, illustrates a computer-implemented methodology for automatically generating a summary of activity that an entity did not observe during resolution of an issue, in accordance with one or more embodiments.

At 1210, a notification can be received at a summary component (e.g., summary component 150) that an entity (e.g., entity 136A-n) has been assigned to resolving an issue (e.g., issue 105U). The entity can be assigned as part of an automated entity recommendation operation performed by a recommend entity component (e.g., recommend entity component 140), wherein the notification can be generated and transmitted by the recommend entity component and received/processed by the summary component, wherein the notification further identifies the entity joining a group of one or more entities assigned to resolve the issue.

At 1220, the summary component can be configured to identify/determine a duration of time and/or volume of activity performed by one or more entities involved in resolving the issue. As previously mentioned with regard to operation and functionality of the initial entity component 135, an entity can be assigned at the initiation of activity to resolve the issue. However, as also previously mentioned, (a) an entity can be assigned to resolving the issue after prior activity has already been undertaken, e.g., resolution of the issue has already been ongoing for 30 minutes, an hour, a day, etc., or (b) an entity was previously assigned to resolving the issue, was at some later point in time revoked (e.g., by revoke entity component 145) from resolving the issue (e.g., due to inactivity), but is subsequently being reassigned (e.g., based on recommendation from the recommend entity component 140) to resolving the issue. For both scenarios (a) and (b), the recommended entity will not have observed activity when they recommended entity was not present on a team resolving the issue. Hence, for scenario (a), the duration of time/activity which was unobserved by the recommended entity will be the activity conducted from when the project was initiated through to the time at which the recommended entity joins the project. Further, for scenario (b), the duration of time/activity which was not observed by the returning entity is the activity conducted from when the entity was revoked from the project through to the time at which the entity returned to the project.

At 1230, the respective unobserved content can be identified by the summary component. In an embodiment, the unobserved content for a conversation (e.g., where the unobserved content is considered to be a conversation 126B, where conversation 126B is a portion of the entirety of conversation 126A conducted since initiation of the project) can include various themes/artefacts (e.g., threads 127A-n, artefacts 810A-n) relating to such topics as issue symptom, entity activity, entity investigation, issue resolution, and suchlike, as previously mentioned.

At 1240, in an embodiment, an artefact summarizer (e.g., artefact summarizer 820) can be configured to generate respective summaries (152A-n), wherein each summary can pertain to one or more of the artefacts.

At 1250, the summary component can further include a full conversation summarizer (e.g., full conversation summarizer 830) configured to incorporate one or more of the artefact summaries into a general/omnibus summary providing a level of summary as required for the particular entity (e.g., the summary component 150 is provided with role information regarding the entity of concern). Hence, from the same unobserved content, a first omnibus summary (e.g., summary 152X) is generated for a first entity, while a second omnibus summary (e.g., summary 152Y) is generated for a second entity, wherein the first entity and the second entity have different roles/skillsets/information requirements.

At 1260, the summary component is configured to provide the respective summary to the respective entity for which the summary has been generated.

Figure 13:
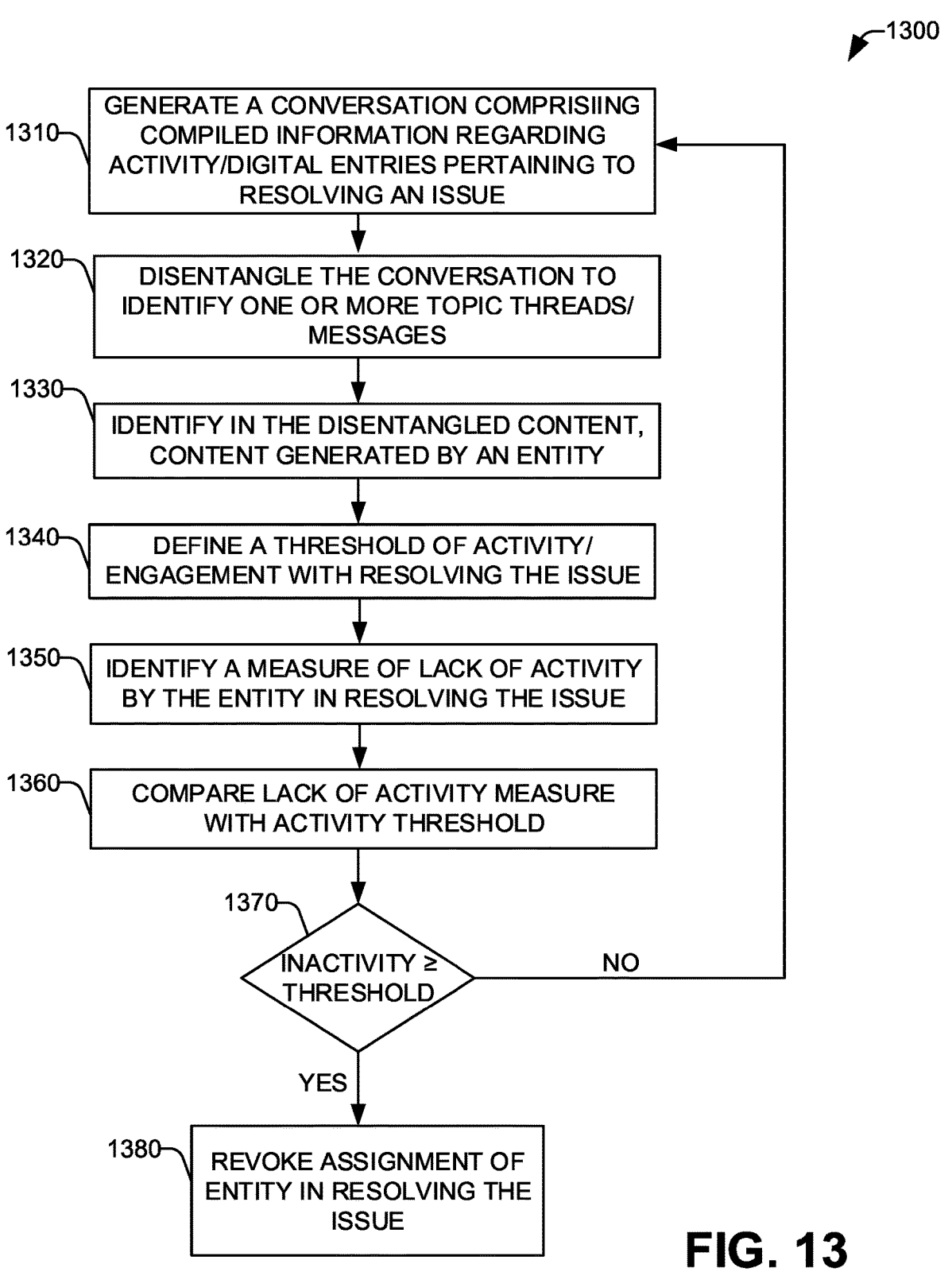
FIG. 13 illustrates a computer-implemented methodology for automatically removing an entity currently assigned to a project to resolve an issue, according to one or more embodiments.

FIG. 13, methodology 1300, illustrates a computer-implemented methodology for automatically removing an entity currently assigned to a project to resolve an issue, according to one or more embodiments.

At 1310, a conversation component (e.g., conversation component 120) can be configured to compile activity conducted in resolving a current issue and further generate a conversation (e.g., as conversation 126A-n) from the compiled information.

At 1320, the conversation (e.g., conversation 126A) can be disentangled by a conversation disentangle component (e.g., conversation disentangle component 410) to identify one or more threads (e.g., threads 127A-n) included in the conversation, wherein the one or more threads can be respectively associated with various topics, subject matter, etc., as previously described.

At 1330, the threads can be applied to a revoke entity component (e.g., revoke entity component 145), wherein the revoke entity component can have undergone prior training with one or more datasets comprising sequences of utterances, actions, and the like, between respective entities as an issue is being resolved. By training the revoke entity component with the one or more datasets, the revoke entity component (e.g., a mathematical model) can be configured to identify respective utterances, etc., in the respective threads disentangled from the current conversation (e.g., current conversation 126A), and further identify the respective entity generating the respective utterance.

At 1340, a threshold (e.g., threshold 520A) can be defined/applied to the revoke entity component, whereby the threshold can be any suitable measure for which inactivity of an entity can be determined, e.g., time T for which activity in the conversation is to occur, a number of messages NM for which an entity is required to be involved with, and suchlike.

At 1350, the last utterance by an entity can be identified by the revoke entity component in conjunction with a most recent utterance (or an utterance of interest, e.g., specific utterance occurred 20 minutes ago). The revoke entity component can be further configured to identify a parameter, e.g., a time $T_{IN}$ for which the entity has been inactive, identify a number of messages $NM_{IN}$ for which the entity has been inactive, and suchlike.

At 1360, the difference between the determined parameter and the threshold value can be determined by an activity component (e.g., activity component 510), whereby the activity component can be configured to determine whether $T_{IN}$ equals or exceeds T, $NM_{IN}$ equals or exceeds NM, and suchlike.

At 1370, in response to a determination that the determined parameter is less than the threshold value, methodology 1300 can return to 1310 for further determination of entity activity, or lack thereof, to be determined. In an embodiment, the conversation can be updated by the conversation component to enable a future determination of inactivity to be conducted based on recent activity/digital input by the respective entities (e.g., entities 136A-n).

At 1370, in response to a determination that the determined parameter equals/exceeds the threshold value, methodology 1300 can advance to 1380, whereupon, engagement of the entity in the project can be revoked by the revoke entity component. As previously described, a subsequent determination can be made by the recommend entity component that the entity should rejoin the project in resolving the issue.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Per the various embodiments presented herein, various components included in the IRS 110, IRC 115, conversation component 120, initial entity component 135, recommend entity component 140, revoke entity component 145, summary component 150, and suchlike, can include AI and ML and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process (e.g., by IRC 115 in conjunction with initial entity component 135) for determining one or more entities 136A-n to initially assign to the project, a process (e.g., by IRC 115 in conjunction with conversation component 120) for compiling and disentangling threads (e.g., threads 127A-n)/activities regarding resolving an issue (e.g., issue 105U), a process (e.g., by IRC 115 in conjunction with recommend entity component 140) to determine and recommend an entity to add to the project, a process (e.g., by IRC 115 in conjunction with revoke entity component 145) to determine and recommend an entity to be removed from the project, a process (e.g., by IRC 115 in conjunction with summary component 150) to determine a period for which an entity was not present on the project, determine project content that the entity is unaware of and generate a summary of that content, and suchlike, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or statistical-based analysis (e.g., factoring into the analysis utilities and costs) to prognose or infer an action that a user desires to be automatically performed (e.g., assigning/removing an entity in resolving an issue, and operations related thereto).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, probability of an having previously worked on an issue similar to the unresolved issue, for example.

As described supra, inferences can be made, and automated operations performed, based on numerous pieces of information. For example, whether the conversations 126A-n and threads 127A-n have been correctly generated/combined/identified by the conversation component 120, the respective entities 136A-n have been correctly identified for initial inclusion (e.g., by the initial entity component 135), recommended for subsequent inclusion (e.g., by the recommend entity component 140), removed from the project (e.g., by the revoke entity component 145), creation of an accurate/useful/pertinent summary 152A-n (e.g., by summary component 150), and suchlike, to enable an issue 105U to be expeditiously resolved with a group of entities 136A-n being efficiently assigned/removed as the project team attempts to resolve the issue.

Example Applications and Use

Figure 14:
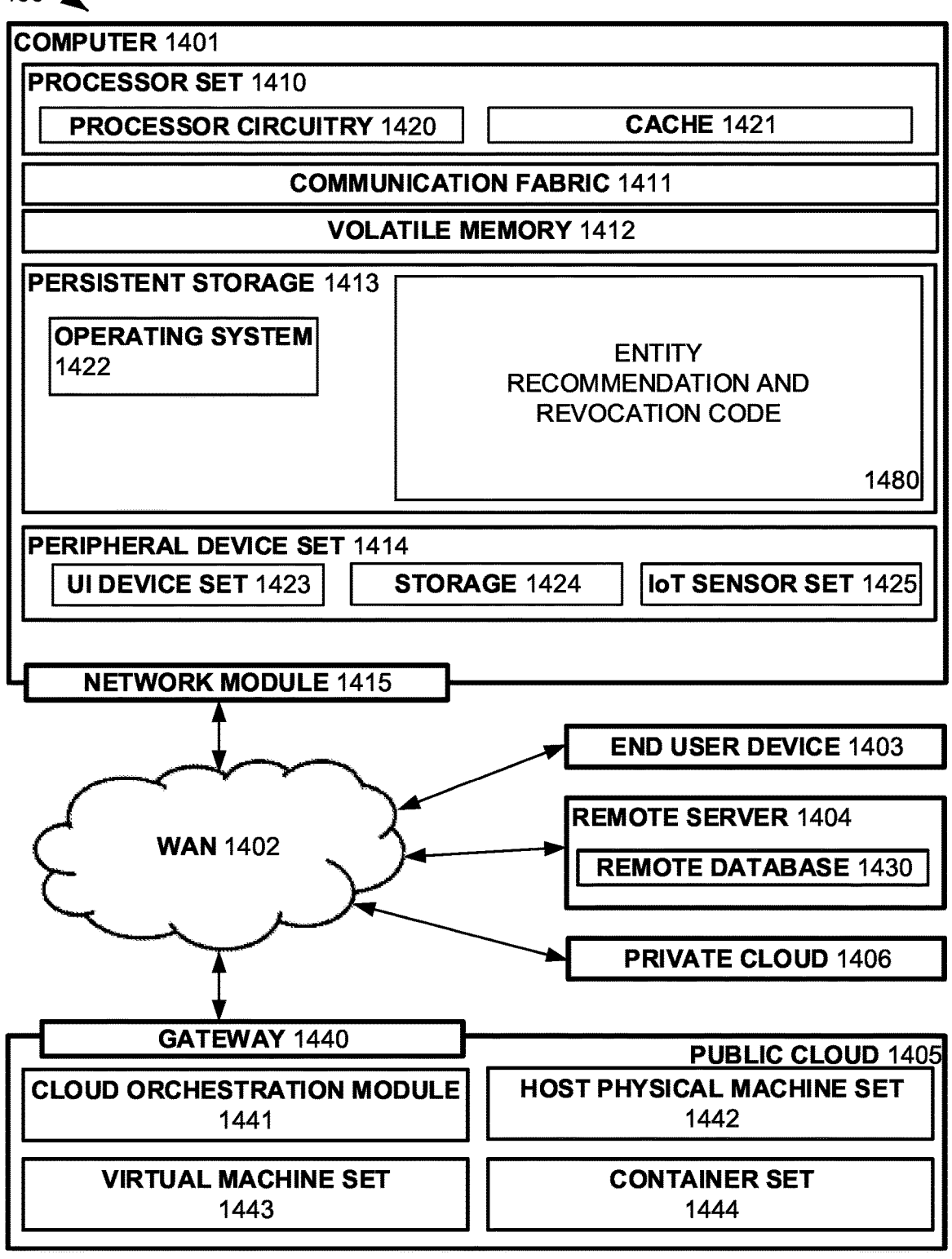
FIG. 14 depicts an example schematic block diagram of a computing environment with which the disclosed subject matter can interact/be implemented at least in part, in accordance with various aspects and implementations of the subject disclosure.

FIG. 14 and the following discussion are intended to provide a brief, general description of a suitable computing environment 1400 in which one or more embodiments described herein at FIGS. 1-13 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 contains an example of an environment for the execution of at least some of the computer code involved in performing the inventive methods and embodiments presented herein, such as automatically recommending and revoking entities to assist in resolving an issue (e.g., issue 105U to create 105R) by an IRS (e.g., IRS 110 and subcomponents) through the application of entity recommendation and revocation code 1480. In an embodiment, the entity recommendation and revocation code 1480 can comprise one or more components included in the issue resolution system 110.

In addition to block 1480, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1480, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method can be distributed among multiple computers and/or between multiple locations. On the other hand, in this presentation of computing environment 1400, detailed discussion is focused on a single computer, specifically computer 1401, to keep the presentation as simple as possible. Computer 1401 can be located in a cloud, even though it is not shown in a cloud in FIG. 14. On the other hand, computer 1401 is not required to be in a cloud except to any extent as can be affirmatively indicated.

PROCESSOR SET 1410 includes one, or more, computer processors of any type now known or to be developed in the future. Processing circuitry 1420 can be distributed over multiple packages, for example, multiple, coordinated integrated circuit chips. Processing circuitry 1420 can implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set can be located "off chip." In some computing environments, processor set 1410 can be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods can be stored in block 1480 in persistent storage 1413.

COMMUNICATION FABRIC 1411 is the signal conduction path that allows the various components of computer 1401 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory can be distributed over multiple packages and/or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 can be a read only memory (ROM), but typically at least a portion of the persistent storage allows writing of data, deletion of data and re-writing of data. Some familiar forms of persistent storage include magnetic disks and solid-state storage devices. Operating system 1422 can take several forms, such as various known proprietary operating systems or open-source Portable Operating System Interface type operating systems that employ a kernel. The code included in block 1480 typically includes at least some of the computer code involved in performing the inventive methods.

PERIPHERAL DEVICE SET 1414 includes the set of peripheral devices of computer 1401. Data communication connections between the peripheral devices and the other components of computer 1401 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 can include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 can be persistent and/or volatile. In some embodiments, storage 1424 can take the form of a quantum computing storage device for storing data in the form of qubits. In embodiments where computer 1401 is required to have a large amount of storage (for example, where computer 1401 locally stores and manages a large database) then this storage can be provided by peripheral storage devices designed for storing large amounts of data, such as a storage area network (SAN) that is shared by multiple, geographically distributed computers. IoT sensor set 1425 is made up of sensors that can be used in Internet of Things applications. For example, one sensor can be a thermometer and another sensor can be a motion detector.

NETWORK MODULE 1415 is the collection of computer software, hardware, and firmware that allows computer 1401 to communicate with other computers through WAN 1402. Network module 1415 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401) and can take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 can be a client device, such as thin client, heavy client, mainframe computer and/or desktop computer.

REMOTE SERVER 1404 is any computer system that serves at least some data and/or functionality to computer 1401. Remote server 1404 can be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data can be provided to computer 1401 from remote database 1430 of remote server 1404.

PUBLIC CLOUD 1405 is any computer system available for use by multiple entities that provides on-demand availability of computer system resources and/or other computer capabilities, especially data storage (cloud storage) and computing power, without direct active management by the scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs can be stored as images and can be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware and firmware allowing public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the Figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory operatively coupled to the system, wherein the memory stores computer executable components; and
a processor that executes the computer executable components stored in the memory, wherein the computer executable components comprise:
an initial entity component configured to:
identify first content pertaining to an issue;
based on the first content, identify second content in at least one prior issue resolution, wherein the first content and the second content are similar;
identify a first entity associated with second content;
assign the first entity to initiate a process for resolving the issue; and
a recommend entity component configured to:
identify third content pertaining to the issue, wherein the third content is a digital entry submitted by the first entity while attempting to resolve the issue;
based on the third content, identify a second entity to partake in resolving the issue; and
assign the second entity to resolve the issue.

2. The system of claim 1, wherein the first content is included in information initially compiled regarding the issue.

3. The system of claim 1, wherein the issue is an event in an information technology system.

4. The system of claim 1, wherein the recommend entity component is further configured to:
identify fourth content, wherein the fourth content is generated in a digital conversation between the first entity and the second entity, wherein the digital conversation pertains to resolving the issue;
based on the fourth content, identify a third entity to partake in resolving the issue; and
assign the third entity to join the first entity and the second entity in resolving the issue.

5. The system of claim 4, the computer-executable components further comprising a summary component configured to:
identify a first time, wherein the first time is a time at which the third entity was assigned to resolving the issue;
identify a second time, wherein the second time is the time at which resolution of the issue was initiated;
determine activities performed by the first entity and the second entity in resolving the issue between the first time and the second time;
generate a summary of the activities performed by the first entity and the second entity between the first time and the second time; and
provide the third entity with the summary.

6. The system of claim 5, wherein the summary component is further configured to:
receive an operational role of the third entity; and
configure the summary based on the operational role of the third entity.

7. The system of claim 4, wherein the first entity, the second entity, and the third entity comprise a group of entities assigned to resolve the issue, wherein the computer-executable components further comprise a revoke entity component configured to:

further monitor the digital conversation between the group of entities to identify a period of time for which the first entity in the group of entities has not partaken in the digital conversation;

determine whether the period of time exceeds a threshold period of time; and based on the period of time exceeds the threshold period of time, remove the first entity from the group of entities.

8. The system of claim 7, wherein the recommend entity component is further configured to:

further monitor the digital conversation between the second entity and third entity;

determine the digital conversation pertains to the first entity; and re-assign the first entity to the group of entities resolving the issue.

9. The system of claim 8, wherein the summary component is further configured to:

identify a third time, wherein the third time is a time at which the first entity removed from the group of entities was assigned to resolving the issue;

identify a fourth time, wherein the fourth time is a current time of resolving the issue by the second entity and the third entity;

determine activities performed by the second entity and the third entity in resolving the issue between the third time and the fourth time;

generate a second summary of the activities performed by the second entity and the third entity between the third time and the fourth time; and provide the first entity with the second summary.

10. The system of claim 4, wherein the first entity, the second entity, and the third entity comprise a group of entities assigned to resolve the issue, wherein the computer-executable components further comprise a revoke entity component configured to:

further monitor the digital conversation between the group of entities to identify a number of consecutive messages in the digital conversation during which the first entity in the group of entities did not generate a message in the digital conversation;

determine whether the number of consecutive messages exceeds a threshold number of messages; and based on the number of consecutive messages exceeds the threshold number of messages, remove the first entity from the group of entities assigned to resolving the issue.

11. A computer-implemented method performed by a device operatively coupled to a processor, wherein the method comprising:

identifying a first entity to initiate resolving a current issue, wherein the first entity is identified based on a prior issue to which the first entity was previously assigned is similar to the current issue;

assigning the first entity to initiate resolving the current issue wherein the current issue relates to performance of an information technology operation; and parsing digital content created by the first entity while attempting to resolve the issue;

reviewing one or more prior activities, wherein the one or more prior activities involve a second entity;

determining the one or more prior activities relate to the digital content; and recommending the second entity assist the first entity in resolving the issue.

12. The computer-implemented method of claim 11, further comprising:

monitoring activity of the first entity and the second entity in attempting to resolve the issue;

comparing activity of the second entity in attempting to resolve the issue;

determining the second entity is no longer engaged in attempting to resolve the issue; and revoking engagement of the second entity in resolving the issue.

13. The computer implemented method of claim 11, wherein the determination of the second entity is no longer engaged in attempting to resolve the issue is based on at least one of a period of inactivity or amount of digital content generated.

14. The computer implemented method of claim 11, further comprising:

determining an engagement time, wherein the engagement time is a time at which the second entity joined the first entity in attempting to resolve the issue;

determining unobserved activity undertaken by the first entity between initiation of resolving the issue and the engagement time, wherein the unobserved activity is activity performed by at least the first entity in resolving the issue;

generating a summary of the unobserved activity; and providing the summary of the unobserved activity to the second entity.

15. A computer program product stored on a non-transitory computer-readable medium and comprising machine-executable instructions, wherein, in response to being executed, the machine-executable instructions cause a machine to perform operations, comprising:

identifying a first entity to initiate resolving a current issue, wherein the first entity is identified based on a prior issue to which the first entity was previously assigned is similar to the current issue; and assigning the first entity to initiate resolving the current issue wherein the current issue relates to performance of an information technology operation;

parsing digital content created by the first entity while attempting to resolve the issue;

reviewing one or more prior activities, wherein the one or more prior activities involve a second entity;

determining the one or more prior activities relate to the digital content; and recommending the second entity assist the first entity in resolving the issue.

16. The computer program product according to claim 15, wherein the operations further comprise:

monitoring activity of the first entity and the second entity in attempting to resolve the issue;

comparing activity of the second entity in attempting to resolve the issue;

determining the second entity is no longer engaged in attempting to resolve the issue; and revoking engagement of the second entity in resolving the issue.

17. The computer program product according to claim 15, wherein the operations further comprise: determining an engagement time, wherein the engagement time is a time at which the second entity joined the first entity in attempting to resolve the issue; determining unobserved activity undertaken by the first entity between initiation of resolving the issue and the engagement time, wherein the unobserved activity is activity performed by at least the first entity in resolving the issue; identifying an operational role of the second entity; generating a summary of the unobserved activity, wherein the summary is generated based on the operational role of the second entity; and providing the summary of the unobserved activity to the second entity.

* * * * *